US011822067B2

(12) United States Patent
Roggenbuck et al.

(10) Patent No.: US 11,822,067 B2
(45) Date of Patent: Nov. 21, 2023

(54) XYZ MICROSCOPE STAGE WITH A VERTICALLY TRANSLATABLE CARRIAGE

(71) Applicants: MEDIPAN GmbH, Dahlewitz (DE); CYBERTRON GmbH, Berlin (DE)

(72) Inventors: Dirk Roggenbuck, Strausberg (DE); Matthias Arndt, Berlin (DE)

(73) Assignees: MEDIPAN GMBH, Dahlewitz (DE); CYBERTRON GMBH, Berlin (DE)

( * ) Notice: Subject to any disclaimer, the term of this patent is extended or adjusted under 35 U.S.C. 154(b) by 275 days.

(21) Appl. No.: 16/911,995

(22) Filed: Jun. 25, 2020

(65) Prior Publication Data
US 2021/0033840 A1 Feb. 4, 2021

(30) Foreign Application Priority Data
Jun. 27, 2019 (EP) .................................... 19182835

(51) Int. Cl.
*G02B 21/26* (2006.01)
*G02B 21/24* (2006.01)
*G01N 21/64* (2006.01)

(52) U.S. Cl.
CPC ........... *G02B 21/241* (2013.01); *G02B 21/26* (2013.01); *G01N 21/6486* (2013.01)

(58) Field of Classification Search
CPC ...... G02B 21/00; G02B 21/006; G02B 21/24; G02B 21/241; G02B 21/242; G02B 21/244; G02B 21/26; G02B 21/36; G02B 21/361; G02B 21/365
USPC .................................. 359/368, 383, 391–394
See application file for complete search history.

(56) References Cited

U.S. PATENT DOCUMENTS

| | | | | |
|---|---|---|---|---|
| 5,638,206 A | * | 6/1997 | Sumiya ................. | G01B 11/02 359/371 |
| 5,790,308 A | * | 8/1998 | Kamentsky ............ | G16H 10/40 250/201.3 |
| 5,831,764 A | * | 11/1998 | Brinkmann ............ | G02B 21/26 384/57 |
| 6,337,766 B1 | * | 1/2002 | Fujino .................... | G02B 21/22 359/383 |
| 8,164,829 B2 | * | 4/2012 | Ganser ................... | G02B 21/18 359/393 |
| 8,786,693 B2 | * | 7/2014 | Kihara .................. | G02B 21/365 359/383 |

(Continued)

FOREIGN PATENT DOCUMENTS

| | | |
|---|---|---|
| CN | 203479812 U | 3/2014 |
| CN | 108938321 * | 5/2017 |
| DE | 4338155 A1 | 5/1995 |

(Continued)

*Primary Examiner* — Thong Q Nguyen
(74) *Attorney, Agent, or Firm* — MaxGoLaw PLLC

(57) ABSTRACT

The invention relates to an automatic focusing apparatus for the microscopic examination of a plurality of spatially distributed (biological) samples, whereby an object stage that is vertically movable relative to the microscope has a carriage that is translatable along the x-axis and y-axis and a sample stage that is translatable along the z-axis and is mounted on the carriage. Furthermore, the invention relates to a method for automatic focusing and microscopic examination of a plurality of spatially distributed biological samples, through a microscope having an object stage that is vertically movable relative to the microscope.

11 Claims, 8 Drawing Sheets

(56) References Cited

U.S. PATENT DOCUMENTS

2017/0072561 A1* 3/2017 Schlegel ................ B25J 9/1035

FOREIGN PATENT DOCUMENTS

| DE | 10017041 A1 | 10/2001 |
|---|---|---|
| JP | H010046 A | 4/1991 |

* cited by examiner

Fig. 7
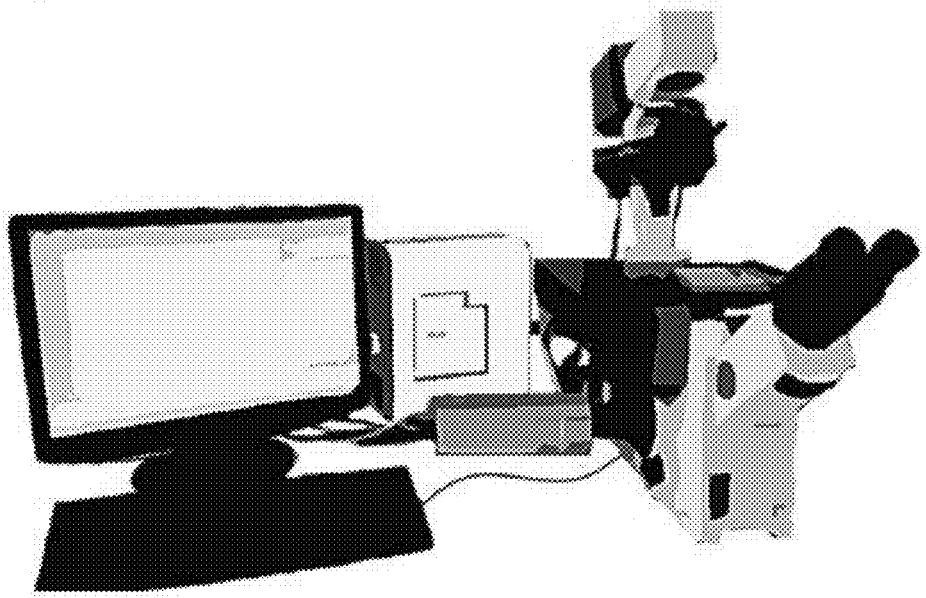
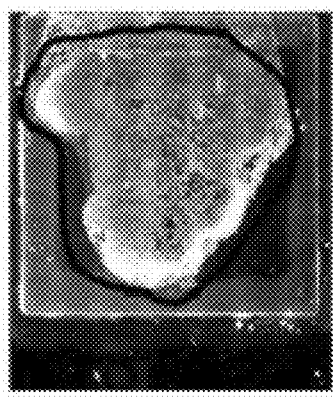  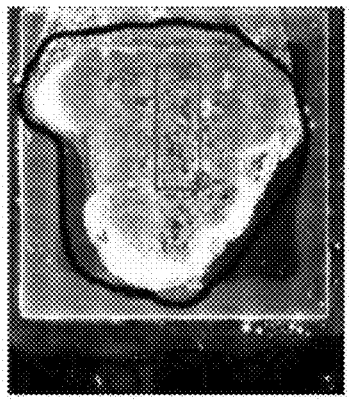
Fig. 8A  Fig. 8B  Fig. 8C

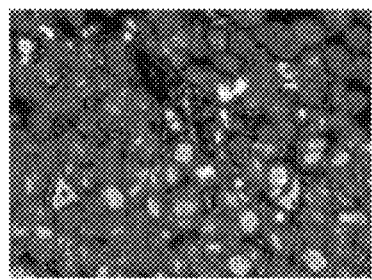 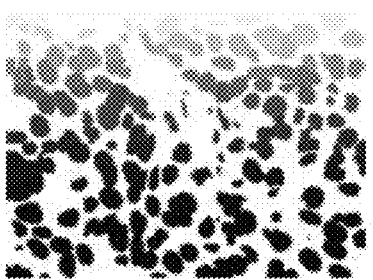 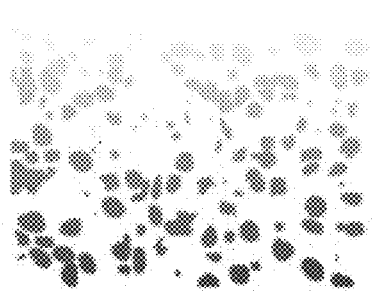
Fig. 9A     Fig. 9B     Fig. 9C
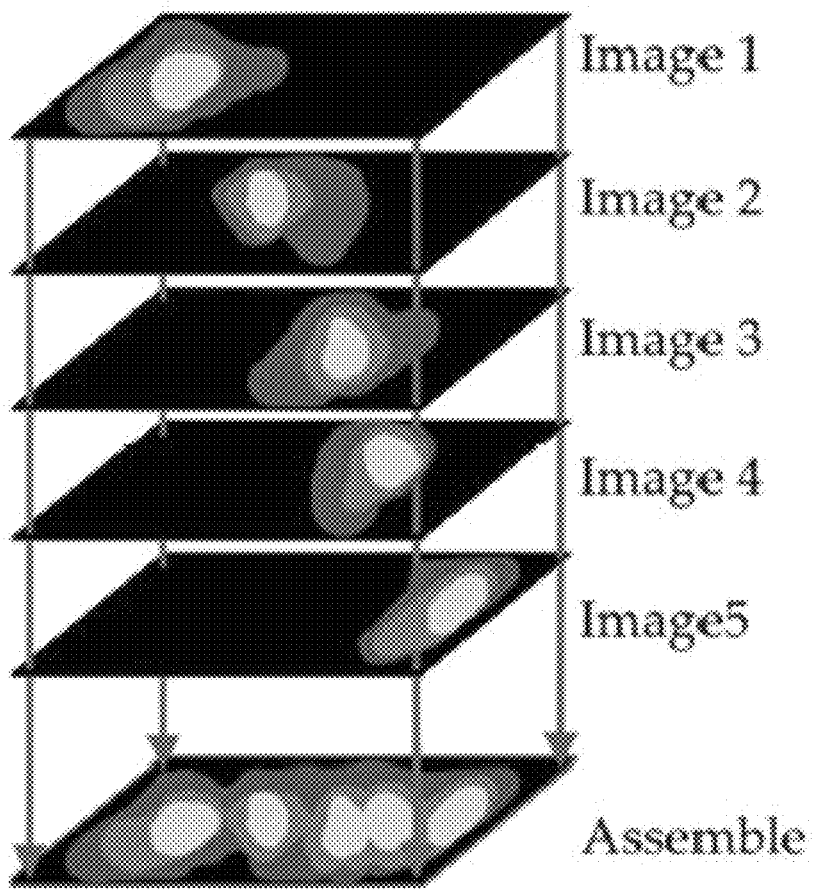
Fig. 10

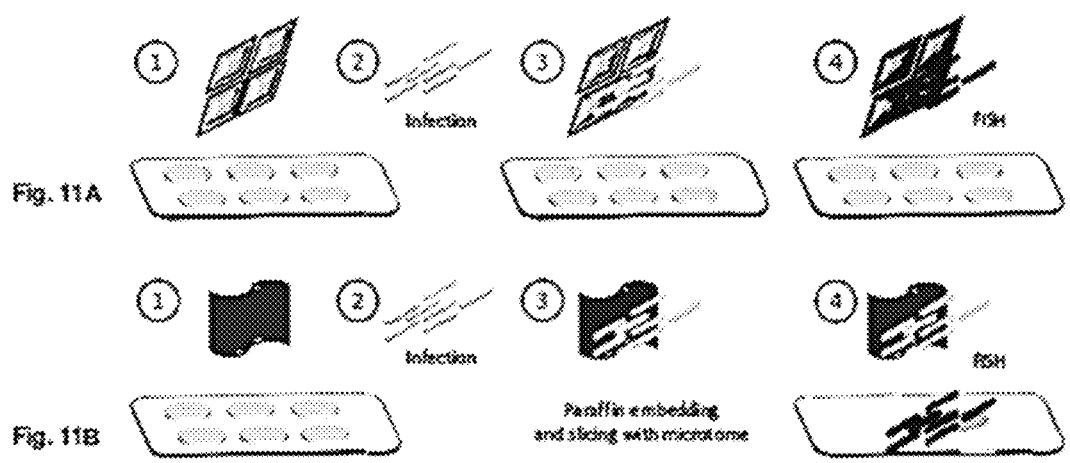
Fig. 11A
Fig. 11B
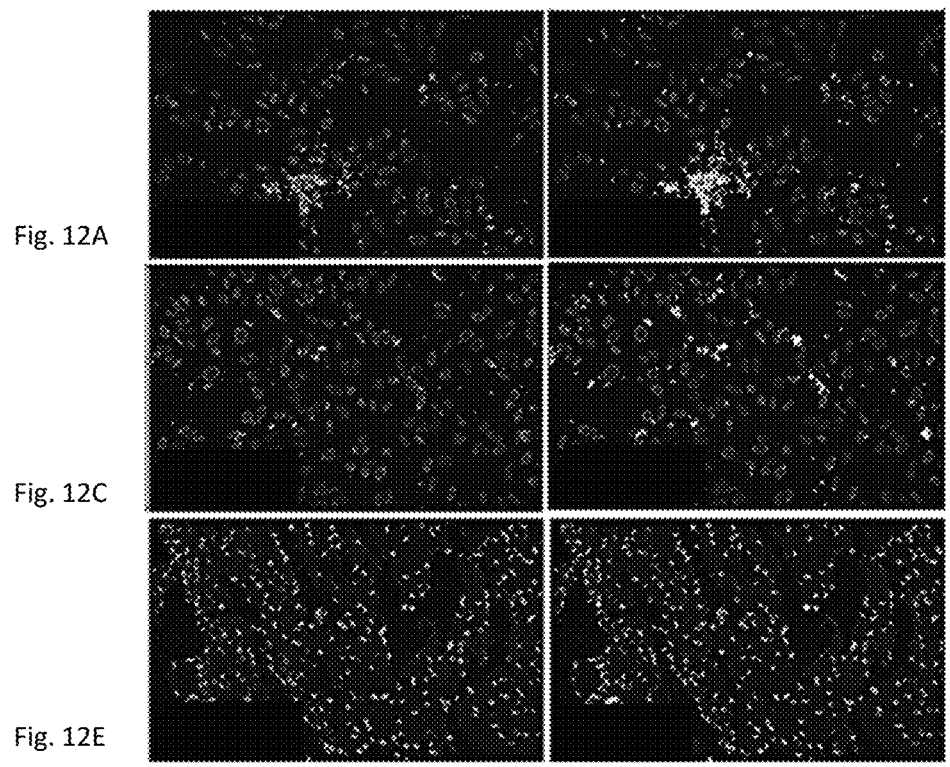
Fig. 12A
Fig. 12B
Fig. 12C
Fig. 12D
Fig. 12E
Fig. 12F

XYZ MICROSCOPE STAGE WITH A VERTICALLY TRANSLATABLE CARRIAGE

FIELD OF THE INVENTION

The invention relates to the field of automated microscope stages for the examination of multiple samples.

BACKGROUND OF THE INVENTION

Examining biological samples through a microscope is an established method in the prior art, permitting comprehensive insights into the sample. For this purpose, various procedures may be used, such as transmitted light microscopy and incident light microscopy as well as various forms of optical microscopy such as fluorescence microscopy. In order to achieve a high throughput of samples analyzed per unit time with the lowest possible use of manpower, modern laboratories use the highest degree of automation possible for scanning the samples automatically through the microscope.

In order for at least partial automation when examining a plurality of biological samples using a microscope, it is necessary that the samples and microscope are able to be moved in an automated, reproducible and precise manner in relation to each other. Thereby, movements along the horizontal plane (x/y-axes) are capable of moving the various samples, which are distributed spatially and in particular horizontally, into position for individual optical examination. The respective samples can be located, for example, in a microtiter plate or multiwell plate, which can comprise a plurality of wells being disposed adjacent to one another with samples contained therein. In addition, a vertical movement (movement along the z-axis) between microscope and sample is desirable for the purpose of focusing on the sample.

On a microscope, the samples are typically disposed on an object stage below the objective lens. The object stage is often movable along the x-axis and y-axis, thus horizontally relative to the objective lens, in order to enable a horizontal alignment of the objective lens and sample in relation to one another. The objective lens itself can then be moved along the z-axis, thus vertically relative to the object stage, for the purpose of focusing. This has the disadvantage, for example, that the relatively heavy objective lens must sometimes be moved against the force of gravity.

However, it is known from CN203479812 U that the object stage can be moved both horizontally and vertically, whereby movement of the objective lens can be avoided.

Yet the prior art devices do not achieve a good decoupling of the various degrees of freedom in the movement of the object stage. Consequently, in the course of a relative movement between the object stage and the objective lens in one spatial direction, the position is often also unintentionally changed with respect to a different spatial direction.

JP H03 100 446 A discloses an apparatus for examining reticle plates with an XYZ stage. However, it does not describe an autofocus mechanism based on a computer analysis of the definition of digital microscope images. It also does not disclose any concepts for actuation of the stage that facilitate a high degree of precision in movements over long ranges of travel, nor any effective decoupling of movements in different directions.

Another problem with the prior art devices is that a dual-stage actuator is often used, primarily for the focus function, due to a lack of precision in the macroscopic mechanical actuators used. Thereby, larger mechanical actuators for large ranges of travel are frequently combined with precision actuators (e.g., piezo actuators) for short and fine-scale distances.

Purely mechanical actuators, which are often robust and cost-efficient and have a large range of travel, frequently do not provide sufficient precision and accuracy in terms of repeat accuracy when adjusting position. Furthermore, decoupling the degrees of freedom is difficult because macroscopic mechanical actuators can often not be manufactured precisely enough.

Often, in the case of mechanical actuators of the prior art, abrasion also causes the precision and repeat accuracy of mechanical actuators to become impaired over the course of their service life.

Therefore, there is a need for an apparatus for automated examination of samples, whereby the object stage for the samples is moved mechanically and yet precisely by the simplest possible means and whereby the individual degrees of freedom of the movement can be decoupled as successfully as possible, in order to increase the precision and repeat accuracy of the movements.

SUMMARY OF THE INVENTION

The object of the invention is to provide an apparatus and a method for microscopic examination of a plurality of spatially distributed samples with automatic focusing, without the disadvantages of the prior art. In particular, one object of the invention was to provide an apparatus for microscopic examination of a plurality of spatially distributed samples with automatic focusing and a corresponding method, wherein a simple, cost-effective, robust, durable, precise movement of the object stage and objective lens of a microscope in relation to one another is enabled, such being characterized by a high level of repeat accuracy and a large distance of travel, which effectively decouples movements in directions that are perpendicular to one another.

In a second aspect, the invention relates to an automatic focusing apparatus for the microscopic examination of a plurality of spatially distributed (biological) samples, whereby an object stage that is vertically movable in relation to the microscope has a carriage that is translatable along the x-axis and y-axis and a sample stage that is translatable along the z-axis and is mounted on the carriage.

In a third aspect, the invention relates to a method for automatic focusing and microscopic examination of a plurality of spatially distributed biological samples, through a microscope having an object stage that is vertically movable in relation to the microscope.

BRIEF DESCRIPTION OF THE DRAWINGS

FIG. 7 illustrates an automatic modular fluorescence microscope with an embodiment of the movable sample stage of the present invention, lateral camera, and mounted LED in the background;

FIGS. 8A-8C show various image filtering of tumor sections where 8A: Overview scan of the tissue section; 8B: Filtered areas with low entropy (background, artifacts or overexposure); 8C: Section for detailed FISH analysis (frame);

FIGS. 9A-9C illustrate watershed transformation where 9A: Overview of the section for the FISH probe analysis; 9B: Result of the Wedge Watershed Transformation; 9C: Result of the conventional Watershed Transformation with various marker points;

FIG. 10 illustrates image consolidation by Wavelet Transformation. Combination of images in order to obtain relevant signals from a plurality of layers in cell nuclei;

FIGS. 11A and 11B show adhesion assay where the cell culture (FIG. 11A) or the pig tissue (FIG. 11B) was infected with a defined quantity of bacteria (2), and after 3 hours incubation (3), the fixation in formalin was carried out (FIG. 11A+FIG. 11B) and the tissue was embedded in paraffin and sliced with a microtome (FIG. 11B), and subsequently the FISH analysis was carried out (FIG. 11A+FIG. 11B); and FIGS. 12A-12F illustrate images from evaluation software for identifying and counting adhering bacteria in cell culture (FIG. 12A+FIG. 12B+FIG. 12C+FIG. 12D) and pig tissue (FIG. 12e+FIG. 12F), where bacteria cells were stained with FISH (Atto647N) and infected host cells with DAPI, and a software algorithm was able to capture high-resolution images (FIGS. 12A, 12C, 12E) and identify stained bacteria (FIGS. 12B, 12D, 12F), where identified bacteria were counted and the size and shape of colonies were analyzed and the number of bacterial cells per $mm^2$ was determined.

DETAILED DESCRIPTION OF THE PREFERRED EMBODIMENTS

Figure 1:
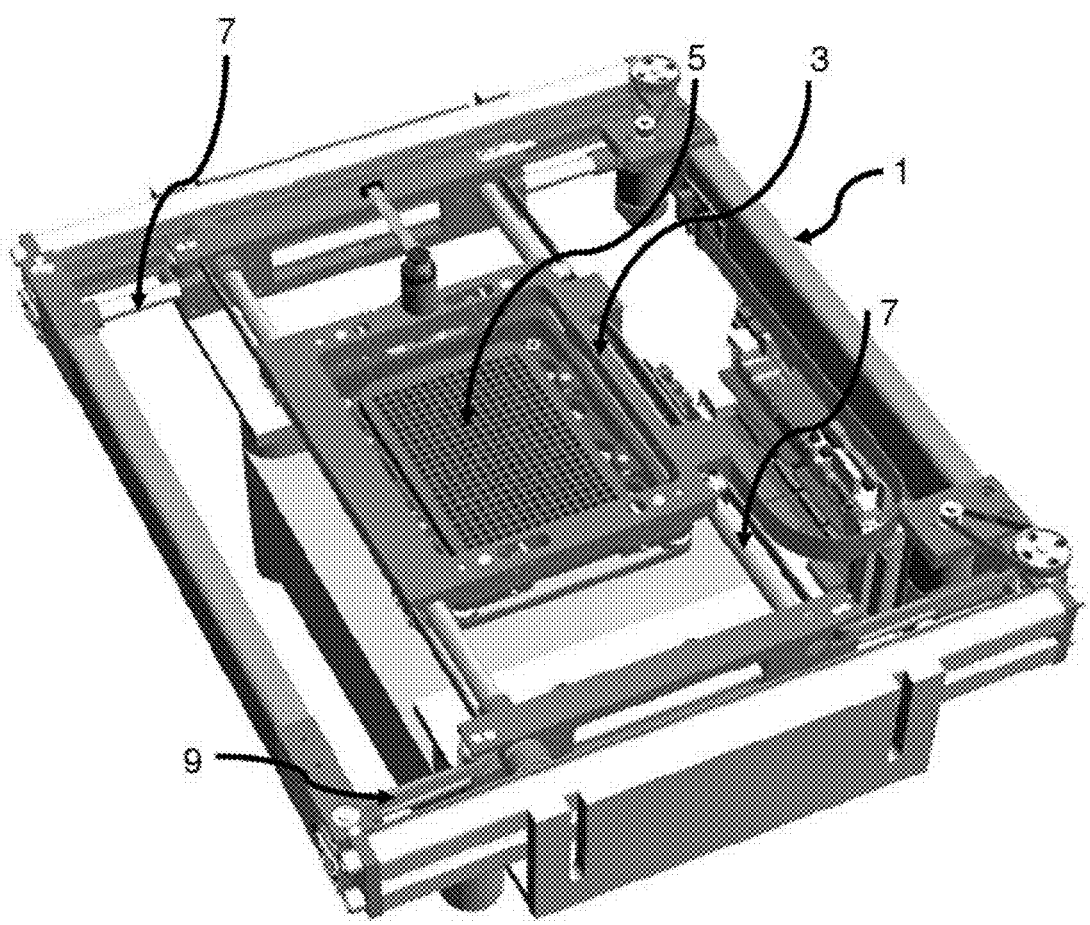
FIG. 1 shows a schematic representation of the apparatus in an oblique top view according to embodiments of the invention.

The object of the invention is achieved by the features of the independent claims. Preferred embodiments of the invention are described in the dependent claims.

In one aspect, the invention relates to an automatic focusing apparatus for the microscopic examination of a plurality of spatially distributed samples, comprising a microscope and an object stage which is movable along the z-axis in relation to the microscope, wherein the object stage comprises a carriage and a sample stage disposed on the carriage, wherein the sample stage is translatable along the z-axis in relation to the carriage, and wherein the carriage is translatable along the x-axis and y-axis in relation to the microscope.

In preferred embodiments, the apparatus comprises an object stage which is movable in all three spatial directions. However, at the same time, movements in the horizontal plane and movements along the z-axis are decoupled. These movements shall preferably occur independently of one another, wherein movements along the x/y-axes (e.g., horizontal movements) are related to the positioning of samples and movements along the z-axis (e.g., vertical movements) are related to focusing. This occurs primarily as a result of the fact that the object stage comprises at least two elements, specifically a carriage and a sample stage. The carriage moves along the x/y-axes (e.g., horizontal plane), while the translatable sample stage disposed on the carriage contains the samples for examination and is additionally movable along the z-axis (e.g., vertical direction) for the purpose of focusing. Automation of the focusing procedure is achieved, for example, by computer analysis of the microscope images of a sample in various vertical positions, wherein the definition of an image can be determined in the respective z-position.

An automatic focusing apparatus for the microscopic examination of a plurality of spatially distributed (biological) samples preferably comprises a microscope and an object stage that is vertically movable in relation to the microscope. The object stage is preferably disposed in relation to the microscope's objective lens in such a manner that the objective lens can be focused on different horizontal and vertical areas of the object stage, dependent on the relative positioning of the object stage.

The apparatus preferably comprises an object stage, which in turn comprises a carriage and a sample stage disposed on the carriage. The carriage is preferably a stable structure, for example in the form of a frame, which is translatable, using an appropriate mechanism, along the x/y-axes in relation to the microscope. Preferably, any translation in relation to the microscope relates in particular to the objective lens of the microscope. The x-axis and y-axis preferably designate two directions that are spatially orthogonal to one another, in particular horizontal directions in space. Even though in this case these directions are primarily designated as horizontal spatial directions, it is nevertheless clear to the person skilled in the art that, in principle, this can mean directions that are arbitrarily perpendicular to one another, collectively spanning a plane, as long as the basic functionality of the apparatus is not influenced.

Preferably, the actuator mechanism of the carriage can be selected arbitrarily, for example it may comprise proven and tested "plotter actuators" and/or belt-driven differential actuators/drivers of the prior art, which for example are realized by means of a belt drive unit powered by an electric motor. With regard to appropriate actuators for the carriage, by way of example, reference is made to DE 43 38 155 A1 and to DE 100 17 041 B4.

The carriage preferably comprises a sample stage movably supported in z-direction and correspondingly translatable along the z-axis. In this document, the terms z-axis and vertical are preferably used synonymously, because focusing is usually carried out through a relative movement between sample and objective lens in a vertical direction. Nevertheless, it is clear to the person skilled in the art that, dependent on the orientation of the x/y-axes and the general spatial arrangement of the apparatus, the z-axis can also designate an arbitrary different direction that is orthogonal to a plane defined by the x/y-axes.

Thus, the samples for analysis, which are preferably contained on the sample stage, are spatially adjusted in particular by translating the carriage along the x/y-axes and translating the sample stage along an axis perpendicular hereto; the sample stage being mounted on the carriage, yet translatably disposed and translatable along the z-axis. The translation of the sample stage is preferably carried out by a mechanical actuator.

By actuating the sample stage along the z-axis instead of the objective lens, the mass which an actuator drive unit must move can be reduced with beneficial effect. In this way, the actuator does not have to be disposed on the microscope itself and therefore does not increase its weight. In particular if the z-axis is consistent with the vertical direction, the mass of the objective lens which must be moved against the force of gravity can be problematic and impede the precision of adjustment. As a result of the simultaneous decoupling of movements along the x/y-axes (preferably in horizontal direction) and along the z-axis (preferably in vertical direction), the respective precision of the movement in a direction can be improved and a reciprocal influence on movements in different spatial directions can be reduced.

Preferably, the apparatus comprises sensors and/or a control unit, by means of which the horizontal translation of the carriage and/or the vertical translation of the sample stage can be controlled and/or adjusted. In particular it is preferred that a preferably three-dimensional position of the sample stage can be established hereby and, if required, can be corrected by an appropriate translation of the object stage. A control unit is in particular an integrated circuit, e.g., a microprocessor and/or a processing unit, for example a PC.

In a preferred embodiment of the invention, the apparatus is configured for automatic focusing by means of computer-aided analysis of the definition of digital microscope images in several positions along the z-axis of the object stage.

The automatic focusing is preferably performed via a computer-aided analysis of the definition of digital microscope images in several vertical positions of the object stage. Therefore, a processing unit is preferably included, e.g., a microprocessor or a computer, and the apparatus can be connected with such a unit. The apparatus thereby preferably moves to various vertical positions along the z-axis (in particular various vertical positions), takes digital microscope images and preferably transfers them to the processing unit. The processing unit itself then analyzes the images with regard to the definition of the depicted objects. The person skilled in the art is aware of corresponding algorithms. When the vertical position is identified, at which the definition is at a maximum, this is preferably the focus position to which the sample is moved for examination with the microscope. For the apparatus to be configured for such a method means in particular that it comprises the appropriate structural features for carrying this out, e.g., processing unit, memory unit, preferably comprising a computer program product for executing appropriate steps etc.

In a preferred embodiment, the invention relates to an automatic focusing apparatus for the microscopic examination of a plurality of spatially distributed samples, comprising a microscope and an object stage that is movable along the z-axis in relation to the microscope, wherein the apparatus is configured for automatic focusing via computer-aided analysis of the definition of digital microscope images in a plurality of vertical positions of the object stage, wherein the object stage comprises a carriage and a sample stage mounted on the carriage, wherein the sample stage is translatable along the z-axis in relation to the carriage, and wherein the carriage is translatable along the x/y-axes in relation to the microscope.

A preferred embodiment of the invention relates to an automatic focusing apparatus for the microscopic examination of a plurality of spatially distributed (biological) samples, comprising a microscope and an object stage that is movable vertically in relation to the microscope, wherein the automatic focusing is performed via computer-aided analysis of the definition of digital microscope images in a plurality of vertical positions of the object stage, wherein the object stage comprises a carriage and a sample stage mounted on the carriage, wherein the sample stage is translatable along the z-axis in relation to the carriage, and wherein the carriage is translatable along the x/y-axes in relation to the microscope.

The aforesaid apparatus, wherein the automatic focusing is performed by means of a computer-aided analysis of the definition of digital microscope images in a plurality of vertical positions of the object stage, is preferably synonymous with an apparatus that is configured to perform the aforesaid procedural steps. The apparatus preferably comprises corresponding structural features, without which such a procedure cannot be performed. Examples include a processing unit, e.g., a computer, a memory unit, preferably comprising a program which controls the execution of the procedural steps as a function of input and output data (e.g., measured data) etc.

In a preferred embodiment of the invention, the sample stage is translated along the z-axis by a mechanical actuator, wherein the actuator comprises a motor and drive means, wherein the motor and drive means are configured for translating the sample stage along the z-axis.

The motor is in particular an electric motor. It may thereby be e.g., a linear actuator; however it is preferably a "classic" electric motor driving a rotary shaft, which is particularly suitable e.g. for actuating the rotation of a threaded spindle and/or toothed wheel. It can preferably also be an electric stepper motor. A stepper motor is preferably an electric synchronous motor, wherein the rotor's rotation can be controlled in steps via an incrementally rotating electromagnetic field of the stator coils. Stepper motors can perform extremely precise movements. The motor is preferably a servomotor. Servomotors are preferably electric motors that enable control of the angular position of the drive shaft, the rotational speed of the drive shaft and/or acceleration of the drive shaft. For this purpose, the motor preferably also comprises a sensor for determining the position of the drive shaft. The rotational position of the drive shaft identified by the sensor can be, for example, transmitted to a preferably comprised control unit and/or a processing unit and compared to setpoints and controlled in this way.

In addition to the motor, an actuator preferably comprises other drive means for achieving the desired movement. In particular, the motor comprises at least a threaded spindle or a toothed wheel as well as means for transmission of the motor's movement to the threaded spindle, such as toothed wheels, a toothed belt and/or a chain etc.

Drive means can preferably comprise at least one threaded spindle and at least one spindle nut compatible therewith. Drive means can likewise comprise at least one toothed wheel and at least one compatible toothed rack. Other elements such as transmission, rolling bearings, sliding bearings, toothed wheels, friction wheels, belts (drive belts), chains, belt pulleys of traction mechanisms and/or couplings can also be comprised singly or plurally. The drive means can also have one single component or a plurality of components.

The motor and drive means being configured for the translation of the sample stage along the z-axis means preferably that they co-operate in such a way as to enable such translation. Thereby, the motor is preferably the source of the mechanical energy required for the occurrence of the translation and the drive means are arranged such that they implement the specific motion type produced by the motor in an appropriate linear movement. By way of example, the motor may have a toothed wheel on its rotating shaft, which engages with a toothed rack, thereby enabling the translatory movement. A realization using a threaded spindle driven by the motor and a spindle nut attached to or mounted on the sample stage is also described in this document. Thereby, threaded spindles may for example be directly installed on the rotating shaft of the motor or preferably be driven by the motor via a gear transmission, a chain drive or a toothed belt drive.

In a further preferred embodiment of the invention, the drive means comprise at least one threaded spindle aligned with the z-axis which is translatably disposed in a spindle nut that is immovably fixed to the sample stage, wherein the motor is configured to control the rotatory movement of the threaded spindle, wherein the threaded spindle is disposed rotatably on the carriage and is immovably installed in an axial direction.

Thereby, the threaded spindle is beneficially disposed rotatably in the spindle nut. Preferably, the threaded spindle and the spindle nut cooperate in such a way as to affect a relative translatory motion of both elements in relation to one another in a longitudinal direction along the threaded spindle, as a result of a concurrent rotatory motion of both elements relative to each other.

This embodiment is preferably also designated as a threaded spindle drive.

A threaded spindle preferably comprises a cylindrical rod in the form of a threaded rod on which preferably a thread is disposed, e.g., a trapezoidal thread or a flat thread. The sample stage thereby preferably comprises a spindle nut for each spindle; the spindle nut fitting to said spindle and being immovably fixed to the sample stage and, for example, embedded in it. Rotation of the spindle, disposed vertically (z-axis) in a longitudinal or axial direction, can thus preferably achieve a translation of the locked spindle nut along the spindle and thus of the sample stage. The threaded spindle preferably has a spindle pitch of 0.25 mm. A particularly precise translation can thereby be realized.

The motor is preferably configured to control the rotatory movement of the threaded spindle, preferably meaning that the motor drives the at least one threaded spindle, e.g., via a toothed belt or a toothed wheel, wherein controlling the motor (e.g., controlling the rotation speed, direction of rotation and/or of the duration and/or scope of rotation) can control the rotatory movement of the threaded spindle, through a corresponding actuation.

The threaded spindle, on which the sample stage is preferably translatably disposed via the spindle nut and translated as a result of the relative rotation of spindle and nut, is preferably rotatable in relation to the carriage, however immovably fixed at least in an axial direction. Thus, a defined movement of the sample stage in relation to the carriage is preferably enabled by rotation of the threaded spindle. Fixed in an axial direction preferably means that no movement of the threaded spindle is possible in an axial direction. Thus, the position of the spindle is preferably well defined at least on the z-axis (preferably in vertical direction). Therefore, the position on the z-axis (e.g., vertical position) of a nut, being rotatably disposed on the spindle, and of the stage, being immovably fixed to the nut, is also preferably well defined at least on the z-axis (preferably in vertical direction) and controllable by rotation of the spindle. It is preferred in particular that the threaded spindle is fixed in all spatial directions and disposed rotatably on the carriage.

In a further preferred embodiment of the invention, the drive means comprises at least one toothed wheel and at least one toothed rack aligned with the z-axis, wherein the motor is configured to control a rotatory movement of the toothed wheel, wherein toothed wheel and toothed rack are configured for translation of the sample stage along the z-axis.

This embodiment is preferably also designated as a toothed rack drive.

The motor may for example have the toothed wheel directly on its shaft. Other possibilities for power transmission to a toothed wheel by a motor are also known to the person skilled in the art, such as actuation via toothed wheels, a toothed belt or a chain drive. The toothed wheel may thereby be disposed rotatably on the sample stage, wherein the toothed rack is connected to the carriage. It may be equally preferable that the toothed wheel is rotatably disposed on the carriage and the toothed rack is connected to the sample stage. It is thereby preferably meant that toothed wheel and toothed rack are configured for translation of the sample stage along the z-axis. Thus, preferably, a translation of the sample stage along the z-axis is actuated by a rotatory movement of the toothed wheel. Said actuation is particularly low maintenance and mechanically stable.

In a further preferred embodiment of the invention, a rotatory movement of a shaft of the motor is transmitted via a toothed wheel and/or a chain to the threaded spindle and/or the toothed wheel of the toothed rack drive. One possibility for transmission of a motor shaft's rotatory movement consists in transmission via a toothed belt or a chain in the case of a toothed belt drive and/or a chain drive. These types of actuation have proven to be particularly efficient and robust.

In a further preferred embodiment of the invention, the rotatory movement is transmitted by a motor shaft, fitted with a driving toothed wheel, via a toothed belt to a toothed wheel that is connected in a non-rotatable manner to the threaded spindle, wherein the spindle nut is preferably disposed between the toothed wheel and the mounting of the threaded spindle on the carriage.

In this embodiment, the motor shaft preferably has a toothed wheel which drives a toothed belt.

Modern high-performance toothed belts enabling very precise actuation, being extremely durable, as are used for example in automotive manufacturing, may preferably be used as the toothed belts. The toothed belt is preferably resistant to abrasion. The use of toothed belts in such a positioning drive is beneficial because they operate in a reproducible manner due to the preferred positive-locking coupling with a toothed wheel, yet e.g., in contrast to chains require no additional lubrication. Toothed belts are preferably essentially without play. Toothed belts may preferably comprise elastomers, in particular natural and/or synthetic rubber, e.g., vulcanized rubber, chloroprene rubber (neoprene), hydrogenated acrylonitrile-butadiene rubber and/or plastic such as polyurethane. For the purpose of stabilization, toothed belts may comprise for example steel cores, however fiber-reinforced toothed belts, containing for example aramid, may also be preferred. Toothed belts may preferably also be manufactured completely or for the most part from aramid or kevlar. As a result of different dimensioning of the driving toothed wheel, which is disposed on the motor shaft, and of the toothed wheel of the threaded spindle, a preferred transmission ratio between the two may be realized. For example, a driving toothed wheel having relatively small dimensions may be combined with a toothed wheel of the threaded spindle having relatively large dimensions. Hereby, in a similar manner to a derailleur gear system on a bicycle, whereby selection of a small sprocket on the crank arm and a large sprocket on the drive wheel selects a corresponding transmission ratio, a high torque transmission is combined with a high degree of precision of movement at a reduced speed of the toothed wheel.

A vertically disposed threaded spindle, being disposed at its upper end rotatably and immovably fixed on the carriage, having a toothed wheel disposed on its lower end, may be assumed as an example of a configuration wherein the spindle nut is preferably disposed on the carriage between toothed wheel and mounting of the threaded spindle. Thereby, the threaded spindle is preferably disposed between the upper mounting and the lower toothed wheel. This can in particular prevent a significant amount of undesired forces being transferred comprising horizontal components onto the threaded spindle and/or onto the sample stage when a vertical translation of the sample stage is intended.

A further preferred embodiment of the invention relates to an automatic focusing apparatus for the microscopic examination of a plurality of spatially distributed biological samples, comprising a microscope and an object stage that is movable vertically in relation to the microscope, wherein the apparatus is configured for automatic focusing via computer-aided analysis of the definition of digital microscope images in a plurality of vertical positions of the object stage, wherein the object stage comprises a carriage and a sample stage mounted on the carriage, wherein the sample stage is translatable along the z-axis in relation to the carriage, wherein the carriage is translatable along the x/y-axes in relation to the microscope, wherein the vertical translation of the sample stage is effected by an actuator comprising a motor and at least one vertically arranged threaded spindle that is translatably disposed in a spindle nut that is immovably fixed to the sample stage, wherein the motor is configured in such a way as to control a rotatory movement of the threaded spindle, wherein the threaded spindle is disposed rotatably and immovably fixed in at least one axial direction on the carriage, wherein the rotatory movement of a motor shaft having a driving toothed wheel is transmitted via a toothed belt to a toothed wheel that is connected non-rotatably to the threaded spindle.

This embodiment provides a particularly precise and mechanically stable translatory movement of the sample stage along the z-axis. By decoupling the motor shaft from the threaded spindle via the toothed belt drive, it is possible to avoid deviations in the rotational axis of the motor shaft from an ideal, precise axis of rotation being transmitted onto the threaded spindle. The toothed belt drive is thereby particularly precise and low-maintenance and furthermore, by selecting appropriate transmission ratios between the toothed wheels, provides the possibility of realizing a transmission mechanism and achieving, for example, a high degree of precision and/or a high level of torque and a high degree of force for the translatory movement. When using a plurality of threaded spindles, a single motor can preferably be used with a single toothed belt to drive the plurality of threaded spindles.

In a further preferred embodiment of the invention, the motor is connected to the sample stage.

The drive means thereby preferably comprises at least one threaded spindle drive and/or a toothed rack drive with toothed wheel, wherein a rotatory movement of a motor shaft is transmitted to the threaded spindle and/or the toothed wheel of the toothed rack drive via a toothed belt and/or a chain, wherein the toothed wheel of the toothed rack drive is preferably disposed rotatably on the sample stage.

In particular, the (at least one) motor is (immovably) fixed to the sample stage. For example, the motor is immovably affixed to the sample stage in the form of a mechanically stable mounting plate. The motor housing and/or the motor shaft mounting may be immovably fixed to the sample stage. Prior art mounting systems may be considered, such as 3-point mounting, 4-point mounting or 5-point mounting and/or a mounting in accordance with the torque-roll-axis concept. For an overview of mounting technology for drive systems, reference may be made for example to the lecture notes regarding motor vehicle drive systems, 3.1 reciprocating piston engines by Dr. Ing. Klaus Herzog [online]. Mittelhessen University of Applied Sciences (Technische Hochschule Mittelhessen) [retrieved on May 23, 2020] Retrieved at <https://www.thm.de/me/images/user/herzog-91/Kfz-Antriebe/
Kfz_Antriebe_3_Hubkolbenmotoren.pdf>.

In the prior art, one previously refrained from the realization of a connection of the motor to the sample stage. For example, the possibility of a transmission of torque from the motor onto the sample stage was deemed disadvantageous. However, surprising benefits can be achieved by selecting a suitable drive concept, a suitable mounting for the drive system and/or using a drive system with adequate torque.

It is beneficial to use an (electric) (rotation) motor that is immovably fixed to the sample stage, its shaft having a toothed wheel that preferably runs on a toothed rack that is connected to the carriage, and in this way realizes the translatory movement. Hereby, installation on the sample stage may be kept especially compact, since the toothed rack is not disposed on the same (the sample stage).

In particular, by connecting the motor to the sample stage in certain drive concepts, additional benefits can be achieved over the prior art where the motor is mounted/connected to the carriage or the microscope. It is particularly beneficial for the drive means thereby to comprise at least one threaded spindle drive and/or a toothed rack drive, wherein a rotatory movement of a motor shaft is transmitted to the threaded spindle and/or the toothed wheel of the toothed rack drive via a toothed belt and/or a chain, wherein the toothed wheel of the toothed rack drive is preferably disposed rotatably on the sample stage. If the motor and the element that is to be driven via the toothed belt drive and/or the chain drive are both disposed in the sample stage, an extremely high degree of positional stability can be achieved for the two mounting points in relation to one another, in particular if the sample stage, comprising the mounting points, is developed in a manner that is highly mechanically stable. Suitable materials, such as metals and alloys, may preferably be used for this purpose. This can highly reduce the effect of strand force, which could cause a movement along the x-axis and/or y-axis and thus cause the undesired coupling of a translation of the sample stage along the z-axis and a movement in the x/y plane of the sample stage relative to the carriage and/or to the microscope. Strand forces may in particular occur with toothed belt drives or chain drives. Thus, a high degree of precision can be achieved in the movement of the sample stage, in particular in the case of the embodiment with a motor immovably fixed to the sample stage, wherein the drive means comprises at least one threaded spindle drive and/or a toothed rack drive, wherein a rotatory movement of a motor shaft is transmitted to the threaded spindle and/or the toothed wheel of the toothed rack drive via a toothed belt and/or a chain, wherein the toothed wheel of the preferred toothed rack drive is disposed rotatably on the sample stage.

Drive concepts using a motor immovably fixed to the sample stage include in particular the use of at least one threaded spindle and at least one corresponding spindle nut, as described in this document, the use of at least one toothed wheel running on at least one corresponding toothed rack, or similar concepts related to a toothed belt drive, a chain drive and/or similar concepts that realize the transmission of the movement to threaded spindle, toothed wheel or the like. Thereby, the negative effects of forces, in particular of strand forces, transmitted between motor and threaded spindle or toothed wheel and the like may be beneficially reduced. These strand forces may have negative consequences, for example in a belt drive or a chain drive, if the drive elements connected to the chain or the belt are not disposed within the same component. Beneficially, both motor and threaded spindle (or toothed wheel in the case of a toothed rack drive) are disposed together in the sample stage (through the nut that is immovably connected to the sample stage). Thereby, the forces working between motor and spindle/toothed wheel are preferably compensated by the sample stage, which in particular is sufficiently mechanically robust.

Such a type of mounting, whereby the motor is disposed on a movable element, and a threaded spindle that is rotatably mounted within the element and which is driven by the motor for the purpose of translating the movable element, is wholly unknown in the prior art for this type of apparatus. This type of mounting offers benefits, in particular when using a toothed belt drive, because otherwise, due to the strand forces transmitted via the belt, a significant force component acts along the x/y axes (e.g., in the horizontal direction) on the threaded spindle that is positioned along the z-axis (i.e., vertically), which could combine a movement of the sample stage (e.g., a vertical movement) with a movement component along the x-axis and/or y-axis (e.g. horizontal movement components) in an undesired manner. The motor is preferably immovably connected to the sample stage in the form of a mechanically stable mounting plate. A further preferred embodiment of the invention relates to an automatic focusing apparatus for the microscopic examination of a plurality of spatially distributed samples, comprising a microscope and an object stage that is movable along the z-axis in relation to the microscope, wherein the apparatus is configured for automatic focusing via computer-aided analysis of the definition of digital microscope images in a plurality of vertical positions of the object stage, wherein the object stage comprises a carriage and a sample stage disposed on the carriage, wherein the sample stage is translatable along the z-axis in relation to the carriage, and wherein the carriage is translatable along the x/y-axes in relation to the microscope, wherein the translation of the sample stage along the z-axis is effected by a mechanical actuator, said mechanical actuator comprising a motor and drive means, wherein motor and drive means are configured to translate the sample stage along the z-axis and said motor is connected to the sample stage.

A further preferred embodiment of the invention relates to an automatic focusing apparatus for the microscopic examination of a plurality of spatially distributed samples, comprising a microscope and an object stage that is movable along the z-axis in relation to the microscope, wherein the apparatus is configured for automatic focusing via computer-aided analysis of the definition of digital microscope images in a plurality of vertical positions of the object stage, wherein the object stage comprises a carriage and a sample stage disposed on the carriage, wherein the sample stage is translatable along the z-axis in relation to the carriage, and wherein the carriage is translatable along the x/y-axes in relation to the microscope, wherein the translation of the sample stage along the z-axis is effected by an actuator, wherein the actuator comprises a motor and at least one threaded spindle aligned with the z-axis, which is translatably disposed in a spindle nut that is immovably connected to the sample stage, wherein the motor is configured to control the rotatory movement of the threaded spindle, wherein the threaded spindle is disposed rotatably and immovably fixed in at least one axial direction on the carriage and wherein the motor is connected to the sample stage.

This embodiment is particularly suitable for achieving a decoupling of forces along the z-axis and forces along the x/y-axes during translation of the sample stage, and is particularly precise and low-maintenance.

A further preferred embodiment of the invention relates to an automatic focusing apparatus for the microscopic examination of a plurality of spatially distributed samples, comprising a microscope and an object stage that is movable along the z-axis in relation to the microscope, wherein the apparatus is configured for automatic focusing via computer-aided analysis of the definition of digital microscope images in a plurality of vertical positions of the object stage, wherein the object stage comprises a carriage and a sample stage disposed on the carriage, wherein the sample stage is translatable along the z-axis in relation to the carriage, and wherein the carriage is translatable along the x/y-axes in relation to the microscope, wherein the translation of the sample stage along the z-axis is effected by an actuator, wherein the actuator comprises a motor and at least one threaded spindle aligned with the z-axis, which is translatably disposed in a spindle nut that is immovably connected to the sample stage, wherein the motor is configured to control the rotatory movement of the threaded spindle, wherein the threaded spindle is disposed rotatably and immovably fixed in at least one axial direction on the carriage and wherein the motor is connected to the sample stage, wherein the rotatory movement of a motor shaft having a driving toothed wheel is transmitted via a toothed belt to a toothed wheel that is connected non-rotatably to the threaded spindle, wherein the spindle nut is preferably disposed between toothed wheel and mounting of the threaded spindle on the carriage.

In this embodiment, motor and drive means are disposed particularly beneficially in order to exert as little undesired force as possible, between the components of the apparatus, that could cause in particular an undesired coupling of movements along the x/y-axes and along the z-axis. In particular, due to the common pivot bearing of the threaded spindle and motor when using a toothed belt, strand forces between these can be compensated as already described elsewhere in this document. The desired decoupling between movements along the x/y-axes and the z-axis can also beneficially be achieved in this way.

In a further preferred embodiment of the invention, 3-5 threaded spindles aligned with the z-axis are comprised, in particular 4 threaded spindles aligned with the z-axis.

In a further preferred embodiment of the invention, the sample stage has essentially rectangular dimensions comprising in each corner area of the sample stage a threaded spindle disposed in a spindle nut or essentially round dimensions comprising at least 3 threaded spindles disposed in a spindle nut arranged along a perimeter area of the sample stage, wherein the rotatory movement is preferably transmitted via the toothed belt.

Definitions and benefits of this embodiment are set out below.

In a preferred embodiment of the invention, the sample stage is translated vertically by an actuator, said actuator comprising a motor and at least one vertically aligned threaded spindle, preferably 3-5 vertically aligned threaded spindles, in particular 4 vertically aligned threaded spindles, which is translatably disposed in a spindle nut that is immovably connected to the sample stage, wherein the motor is configured to control a rotatory movement of the threaded spindle, wherein the motor is connected to the sample stage, wherein the threaded spindle is disposed rotatably on the carriage and immovable at least in an axial direction.

Preferably 3-5 threaded spindles are comprised. In this way, even with a planar dimensioned sample stage, the mass or surface area that is translatable per spindle can be maintained within a preferred range that is not too big. Furthermore, it is beneficially possible to prevent the stage from deflecting in relation to the area connected to the spindle nut, because the bearing load is better distributed as a result of the preferred threaded spindles being spatially distributed across the sample stage.

In particular, 4 threaded spindles are comprised, because this number has proven to be particularly suitable for a precise and uniformly consistent movement of the sample stage. When using a plurality of threaded spindles, a plurality of motors is preferably used, which are identical and are controlled in the same manner and/or a or the plurality of threaded spindles is driven synchronously by the same motor and/or the same actuator mechanism. In this way, it can beneficially be ensured that the vertical translation of each nut disposed on a spindle is uniform, in order that an overall uniform spatial translation of the sample stage is achieved.

The apparatus is characterized in particular in this embodiment by a repeat accuracy of the positioning in the magnitude of 1 micrometer [μm] with simultaneous vertical travel in the magnitude of 1 millimeter [mm], preferably 10 mm and in particular 1 centimeter [cm]. Above all, repeat accuracy is an important variable when using a microscope, in order e.g., to return to previously examined samples. Repeat accuracy is also a decisive variable for the automatic focusing, in order to be able to return to an identified vertical position, corresponding to the highest possible definition.

In a further preferred embodiment of the invention, the sample stage has essentially rectangular dimensions comprising in each corner area of the sample stage a threaded spindle disposed in a spindle nut or essentially round dimensions comprising at least 3 threaded spindles disposed in a spindle nut arranged along a perimeter area of the sample stage, wherein the rotatory movement is preferably transmitted via the toothed belt.

A rectangular sample stage having in every corner a spindle nut and a threaded spindle disposed therein preferably distributes the entire weight load of the sample stage well and efficiently across the individual spindle nuts and threaded spindles. Similarly, to table legs positioned in the corner of a rectangular table, spindle nuts positioned in a corner are particularly well suited for avoiding any tipping and/or excessive sagging of the stage. In this preferred variant, preferably four threaded spindles are used in this way, which are disposed in the four corner areas of the sample stage. A rectangular sample stage has proven to be ideal and particularly space-efficient for a plurality of applications, for example when using a preferably likewise rectangular microtiter plate.

For some applications, preferably round sample stages are particularly suitable, especially if rotational symmetry is preferred in parts of the structure. Thereby, a movement of the carriage can preferably also comprise a rotatory movement within the horizontal plane, in order to be able to use this rotational symmetry particularly well. The at least 3 threaded spindles disposed along a peripheral area of the sample stage and mounted in a spindle nut are preferably distributed essentially uniformly across the peripheral surface or perimeter area.

In this embodiment, both for a round and a square sample stage, in particular all threaded spindles are driven with a single motor via a single toothed belt, which is preferably tensioned around the toothed wheels of all threaded spindles and driven via the driving toothed wheel of the motor. This shows another advantage of the toothed belt drive, which on the one hand very efficiently enables the combined driving of spatially distributed spindles by a single motor, and on the other hand ensures the synchronization of the rotations of all actuated threaded spindles. In a further preferred embodiment of the invention, the toothed wheel is wider than a sum of travel along the z-axis and a width of the toothed belt, wherein the toothed wheel and the toothed belt are arranged such that said toothed belt is essentially disposed with its full width on the toothed wheel across a complete range of travel of the sample stage.

Details, definitions and advantages of this embodiment are also to be found later on in this document. The aim of the embodiment is in particular for the entire width of the toothed belt to remain on the toothed wheel across the entire possible range of travel of the sample stage along the z-axis, in order beneficially to enable an optimum transmission of force. The person skilled in the art knows that the arrangement of the toothed belt also has an impact on the arrangement of the driving toothed wheel, as the latter drives the toothed belt.

In a further preferred embodiment of the invention, the sample stage is mounted translatably along the z-axis on the carriage by at least two pins, said pins being aligned with the z-axis and mounted on the carriage and/or the sample stage.

The pins are preferably thereby connected either to the carriage or the sample stage and mounted translatably along the z-axis on the respective other element. The pins beneficially prevent relative movements between sample stage and carriage along the x-axis and/or y-axis. This enables the sample stage to move along the z-axis while simultaneously preventing degrees of freedom along the x/y-axes.

In a further preferred embodiment of the invention, the sample stage is mounted to the carriage, translatably along the z-axis, by a sliding mounting of at least two vertical pins fixed immovably to the carriage, said sliding mounting comprising a sliding bearing fixed immovably to the sample stage, preferably the sliding bearing comprising one at least partially prismatic shaped sliding bearing and preferably at least one spring per sliding bearing configured for exerting a tractive force between sample stage and carriage, and configured in particular to aid the movement of the pin in the prismatic part of the sliding bearing.

In a further preferred embodiment, the sample stage comprises at least two partially prismatic shaped sliding bearings and the pins aligned with the z-axis respectively comprise a spherical section, wherein said prismatic shaped sliding bearing and spherical section are configured for guiding the sample stage along the z-axis.

A further preferred embodiment of the invention comprises at least one spring per siding bearing, which exerts a tractive force between sample stage and carriage, and is configured in particular to support the movement of the pin in the prismatic part of the bearing.

In a further preferred embodiment of the invention, the sample stage comprises precisely two pins with a spherical section aligned with the z-axis and at least one spring per sliding bearing, which exert a tractive force between sample stage and carriage, and are configured in particular to support the movement of the pin in a prismatic part of the bearing.

This embodiment enables in particular the use of only two vertical pins with spherical section as described herein. In this way, friction and in particular the stick-slip effect can be particularly avoided and the structure is particularly simple and mechanically robust. This enables the sample stage to move along the z-axis while simultaneously preventing degrees of freedom along the x/y-axes.

In a further preferred embodiment, the sample stage comprises at least two partially prismatic shaped sliding bearings and the pins with spherical section aligned with the z-axis, wherein said prismatic shaped sliding bearing and spherical section are configured for guiding the sample stage along the z-axis, wherein at least one spring per sliding bearing is comprised, which exerts a tractive force between sample stage and carriage, and which is configured in particular to support the movement of the pin in the prismatic part of the sliding bearing. Thereby, preferably as many pins as sliding bearings are comprised.

In particular, precisely two pins with spherical section and precisely two sliding bearings are comprised. In this way, the structure can be kept particularly simple and the movement of the sample stage by the pins is particularly low-friction.

In particular, a sliding bearing in the form of a bushing and/or a hollow bore in the sample stage for the mounting and/or guide for the vertical pins offers an inexpensive and effective solution for a mounting that is translatable along the z-axis.

An at least partially prismatic shaped sliding bearing is in particular an essentially or partially prismatic shaped and correspondingly dimensioned opening in the sample stage for mounting and/or bearing a vertical pin by sliding bearing. Essentially or partially in this context means preferably that some corners of the prism may be rounded off, for example with sphericities. Preferably, the "prism" of the opening is a straight prism, having an elevation running essentially parallel to the orientation of the vertical pin. Said opening, dimensioned in this way, is preferably also designated as a groove and in particular in parts is V-shaped. The opening may preferably open into a rectangular area at the open end of the "V". The preferably tapered, in particular V-shaped area of the opening of the sliding bearing is in particular designated as the prismatic part of the sliding bearing. The pin shall beneficially be guided here. This can be implemented for example through at least two of these bearings, which are partially disposed opposite one another at the sample stage and/or through spring forces, which press the pins (in particular also pins with spherical section) into the prismatic part. The pin is thereby essentially only guided in two contact areas, e.g., by two tapered lateral surfaces of the prismatic opening. In this way, for example, there is at least one degree of freedom of movement per pin, also e.g., along the x-axis and/or y-axis in addition to the z-axis. Thereby, for example, two such bearings can be disposed on diagonal sides of the sample stage, so that guidance is sufficient in only two contact areas per bearing. This is possible, for example, if these are respectively disposed for an oppositely oriented positive-locking and force-locking vertical guidance of the respective pin, e.g., through two opposing prismatic formations of the bearing. To support this guide, one spring connected to carriage and sample stage may be used respectively per sliding bearing, having an alignment at an angle to a z-axis (e.g., to the vertical) and in this way also exerting an element of force between carriage and sample stage along the x/y-axes (e.g., horizontally), in addition to a force between carriage and sample stage aligned with the z-axis (e.g., vertically). The spring is preferably disposed in such a way that this element lightly presses the intended contact area of the prismatic bearing against the pin in the x/y plane, in order to enable an effective guidance of the pins without greatly increasing a frictional force.

The pins aligned with the z-axis preferably respectively comprise a spherical section, whereby prismatic shaped sliding bearing and spherical section are configured to guide the sample stage along the z-axis. The spherical section of the pins preferably represents a partial thickening of each pin in the shape of a sphere, which at its taper points transitions seamlessly in a longitudinal direction along the pin. Spherical section and prismatic shaped sliding bearing are thereby preferably disposed in relation to one another such that the spherical section is guided along the z-axis in the sliding bearing for the entire range of travel of the sample stage. Therefore, sliding bearing and spherical section preferably must be correspondingly dimensioned and/or arranged correspondingly in relation to one another. In this way, a situation can be achieved preferably, in contrast to a guided cylindrical pin without spherical section, whereby the sliding bearing is only in contact with the section, and guides it, respectively at two points, and not over extensive one or two-dimensional sections. Thus, the friction can be reduced and in particular a reduction of the stick-slip effect is achieved. Furthermore, an improved guidance accuracy can be achieved.

In particular, sliding bearing and spherical section are configured to guide the spherical section at only two points. This can be achieved, for example, by the sliding bearing not containing the spherical section in a closely fitting manner on all sides. Preferably, the prismatic shaped sliding bearing is V-shaped in the area where it comes into contact with the spherical section. This is preferably the prismatic part of the sliding bearing.

In particular, when using two pins and sliding bearings, these are disposed on the sample stage at 180° to one another and at least partially in opposite directions to one another, and in this way cooperate such that any movement of the sample stage along the x/y-axes in relation to the carriage is prevented. The sliding bearings can thereby preferably be disposed along a diagonal of the sample stage. Preferably, these are thereby supported by springs disposed between carriage and sample stage, which are configured respectively to exert a force along the x/y-axes and also along the z-axis, for example through a diagonal arrangement along the x/y plane and also along the z-axis.

The stick-slip effect describes in particular a jerking sliding action of solid bodies when moved against one another, which is primarily caused by a temporary increase in the static friction over the dynamic friction. In particular, an undesired juddering is often caused by this.

Preferably, in this embodiment each vertical pin is (preferably immovably) connected to the carriage.

Preferably, the pin comprising a spherical section is also designated as a ball pivot pin. The ball pivot pin is preferably screwed securely to the carriage at its upper end. In particular a translation of the pin along the z-axis (e.g., vertically) is thereby prevented. This fixed mounting may, for example, be realized with an additionally press-fitted threaded bushing or a direct threaded connection to the carriage.

The ball pivot pin preferably moves in a V-groove (embodiment of the prismatic sliding bearing), such that in particular essentially two points of contact occur in the groove. The contact between ball and prism is thereby ensured in particular by a diagonally disposed screw tension spring between carriage and sample stage, which exerts forces both along the x/y-axes and along the z-axis. In particular two translative degrees of freedom along the x/y-axes (e.g., the horizontal plane) are restricted, in order that preferably four degrees of freedom remain per pin and sliding bearing (preferably partial rotatory degrees of freedom around the x/y/z-axes and translatory along the z-axis).

The bearing of the "ball" in the groove by means of two points of contact is preferably ensured by compliance with the production tolerances of prism and groove as well as the exerted spring force. The diagonal arrangement of the springs in particular additionally ensures the vertical pressure of the sample stage against the positioning elements of the carriage.

In a preferred embodiment, the invention relates to an automatic focusing apparatus for the microscopic examination of a plurality of spatially distributed samples, comprising a microscope and an object stage that is movable along the z-axis in relation to the microscope, wherein the apparatus is configured for automatic focusing via computer-aided analysis of the definition of digital microscope images in a plurality of vertical positions of the object stage, wherein the object stage comprises a carriage and a sample stage mounted on the carriage, wherein the sample stage is translatable along the z-axis in relation to the carriage, and wherein the carriage is translatable along the x/y-axes in relation to the microscope, wherein the sample stage is mounted translatably along the z-axis in relation to the carriage by at least two pins mounted on the carriage and/or sample stage in alignment with the z-axis, wherein the sample stage comprises at least two partially prismatic shaped sliding bearings and the pins aligned with the z-axis comprise a spherical section, wherein said prismatic shaped sliding bearing and spherical section are configured to guide the sample stage along the z-axis, wherein preferably at least one spring is comprised per sliding bearing, exerting a tractive force between sample stage and carriage, which in particular is configured to support the guidance of the pin in the prismatic part of the sliding bearing.

In a further preferred embodiment of the invention, the sample stage is mounted to the carriage, translatably along the z-axis, by a linear mounting of at least two vertical pins fixed immovably to the carriage, said linear mounting comprising a linear-motion bearing fixed immovably to the sample stage, preferably the linear-motion bearing comprising a one linear ball bearing and preferably at least one spring is configured for exerting a tractive force between sample stage and carriage.

A linear bearing is preferably a bearing enabling a linear movement along a direction in space and preventing other degrees of freedom of movement.

A linear ball bearing is preferably a ball bearing with axial ball rotation, enabling linear movement along this axial direction and beneficially facilitating a low-friction guidance of the translatory movement along the guided element, e.g., a cylindrical element. In this embodiment, preferably at least two vertically disposed pins are used as cylindrical elements, which are connected immovably to the carriage and guide the sample stage via the linear bearing.

By using at least two vertical pins mounted on the sample stage, preferably a precise positioning and guidance of the sample stage in a horizontal direction is enabled, such that the sample stage is positioned as precisely and unchangeably as possible along the x/y-axes in relation to the carriage, wherein a positioning in the horizontal plane preferably only occurs as a result of a movement of the carriage.

A spring, in particular a coil spring, is preferably mounted with one end on the carriage and with the other end on the sample stage, exerting an attractive spring force between the two. Preferably at least one spring is used, in particular 2, 3 or 4 springs. Since the linear bearing preferably enables a low-friction guidance, yet does not restrict the movement, a positioning of the sample stage relative to the carriage can preferably be achieved as a result of the attractive spring force. Thereby, the sample stage is preferably maintained as close as possible to the carriage by the spring force within the scope of its vertical movability resulting from control of the rotation of the threaded spindle. This embodiment with one spring is particularly relevant if the threaded spindle is mounted on the carriage in a type of conical bearing cup, preferably a jewel bearing, enabling rotation of the spindle, however only enabling a loose positional mounting of the spindle and exerting no retaining force, at least in an axial direction, on the spindle. In the case of a jewel bearing, the threaded spindle preferably comprises a conically tipped end, which is mounted in the corresponding concavely conical shaped bearing cup. Thereby, the bearing cup is preferably disposed on the carriage and the threaded spindle preferably comprises the conically tipped end.

Thereby, the anchoring of the spindle and of the sample stage on the x/y-axes in relation to the carriage can preferably be achieved by the mounted vertical pins, wherein the axial anchoring of the spindle on the carriage is achieved by the spring force between sample stage and carriage. The spring and/or the number of springs is preferably selected with regard to spring constant and/or material such that an attractive force between sample stage and carriage is also sufficiently great, in the case of a loaded sample stage, to mount the spindle rotatably but otherwise positionally fixed on the carriage. The durability of the arrangement also preferably plays a role in the selection. Depending on the arrangement of the apparatus, the spring force thereby also counteracts the force of gravity, which exerts on the sample stage. In this way, the sample stage can be positioned in a horizontal direction, being guided in a particularly simple mechanical manner in relation to the carriage. The spindle is thereby, in a particularly efficient manner, mounted axially and positionally fixed yet at the same time rotatably.

Thereby, preferably a plurality of versions of the aforesaid mounting can be combined, but also used individually. Thereby, beneficially, a sufficiently precise mounting is paramount under the respective operating conditions, which for example depending on application is e.g., particularly cost-effective, effective and/or particularly robust.

In a further preferred embodiment of the invention, the sample stage is mounted to the carriage, translatably along the z-axis, by a mounting of the threaded spindle to the carriage, in a way that is immovably fixed along the x/y-axes, preferably by a ball joint bearing and/or a radial/axial bearing.

A radial/axial bearing is preferably a bearing which only permits a shaft or axle rotating therein a desired freedom of movement in a circumferential direction (direction of rotation). A radial/axial bearing may be realized e.g., by two conical bearings or jewel bearings, respectively comprising a conically tipped end of one axle and a correspondingly fitting concavely conically shaped bearing cup. Thereby, the bearing cup is preferably disposed on the carriage or connected thereto and the threaded spindle preferably comprises the conically tipped end.

In particular, a ball joint bearing is comprised, preferably containing a ball socket. A ball joint bearing preferably comprises a joint head with a spheroidal shape and as counterpart preferably a ball socket. It may be preferred that the ball joint is triaxially rotatable in the ball socket, however without enabling any translatory movements. Thereby, preferably the joint head is comprised at the mounted end of the spindle and the ball socket disposed on the carriage.

Such mounting of the threaded spindle(s) can guide their rotatory movement and the vertical translation of the sample stage particularly well, without facilitating undesired translatory movements of the sample stage.

In particular, the ball socket is designed such that it radially encompasses the joint head and/or the threaded spindle in such a way that only a rotation along the rotational axis of the threaded spindle is enabled and the threaded spindle is otherwise immovably mounted on the carriage. Then the ball socket and the ball joint bearing are a realization of a radial/axial bearing.

In particular when using a radial/axial bearing, undesired translatory movements of the sample stage in relation to the carriage in a horizontal direction, also during a vertical translation of the sample stage, can largely be prevented.

In a further preferred embodiment of the invention, the sample stage is mounted to the carriage, translatably along the z-axis, by a mounting of the threaded spindle on the carriage, in a manner that is immovable along the x/y-axes, preferably by a ball socket and/or a radial/axial bearing and by a linear mounting of at least two vertical pins, connected immovably to the carriage, respectively by a linear bearing connected immovably to the sample stage, preferably by a linear ball bearing and by preferably at least one spring, which exerts a tractive force between sample stage and carriage.

In this way, the precision of the positioning can be further improved and any "play" in the sample stage along the x/y-axes in relation to the carriage can be further reduced.

In a further preferred embodiment of the invention, the toothed wheel is wider than a sum of vertical travel of the sample stage and a width of the toothed belt, wherein the toothed wheel and the toothed belt are configured for a contact area comprising the width of the toothed belt in every vertical position of the sample stage within the range of travel.

The width relates preferably to the spatial positioning along the z-axis. The motor is preferably mounted on the sample stage and drives a toothed belt via a driving toothed wheel mounted on its shaft, which in turn preferably drives the toothed wheels of the threaded spindles, which are mounted on the carriage in an axially fixed manner. The sample stage thereby translates, preferably together with motor and driving toothed wheel, vertically in relation to the spindle due to the rotatory movement of the spindle in the spindle nut that is mounted on the sample stage. It is thereby preferred in particular that the toothed belt does not change its vertical position in relation to the driving toothed wheel and preferably translates with it. This can be realized, e.g., by the driving toothed wheel having guide elements which guide the toothed belt in a vertical direction, e.g., via guide rings mounted on the upper and lower sides of the driving toothed wheel, wherein the driving toothed wheel between these guide elements preferably has a height (or width) aligned with the z-axis, corresponding to the width of the toothed belt in transverse direction (z-axis). Then the toothed belt travels, preferably together with the sample stage, in a vertical direction, when the motor drives the spindles via the toothed belt, while the toothed wheels of the spindle are preferably vertically immovable. In this way, there is preferably a vertical relative movement between toothed belt and toothed wheel of the spindle. In order to ensure a contact of the toothed belt with the toothed wheel, in particular across the entire range of travel of the sample stage, it is preferred that the toothed wheel is wider than a sum of vertical travel of the sample stage and a width of the toothed belt. An optimum power transmission by the toothed belt can be ensured in this way. The toothed wheel and the toothed belt being configured for a contact area comprising the width of the toothed belt in every vertical position of the sample stage means that in an initial position of the apparatus preferably all elements are positioned correspondingly to one another, so that the toothed belt contacts the toothed wheel with essentially its complete width for the entire vertical range of travel of the sample stage. This means preferably that the toothed belt is essentially disposed with its full width on the toothed wheel for the entire range of travel of the sample stage.

Preferably there may also be an analogous configuration wherein the sample stage together with the motor and driving toothed wheel translates vertically in relation to the spindle due to the rotatory movement of the spindle in the spindle nut that is mounted on the sample stage, wherein the toothed belt does not also translate. Thereby, the toothed belt preferably only translates relative to the driving toothed wheel, which is why the driving toothed wheel is preferably wider than a sum of vertical travel of the sample stage and a width of the toothed belt, wherein the driving toothed wheel and the toothed belt are configured for a contact area comprising the width of the toothed belt in every vertical position of the sample stage within the range of travel.

Thereby, the toothed wheel or the toothed wheels have guide rings for the toothed belt, whereby the toothed wheel or the toothed wheels preferably have a height (or width) aligned with the z-axis between these guide elements, corresponding to the width of the toothed belt in transverse direction (z-axis). Terms such as essentially, roughly, approximately etc. preferably describe a tolerance range of less than ±20%, preferably less than ±10%, particularly preferably less than ±5% and in particular less than ±1%. "Similar" preferably describes variables which are roughly equivalent. Partially and "about" describes preferably at least 5%, particularly preferably at least 10%, and in particular at least 20%, in some cases at least 40%.

In a further aspect, the invention relates to a method for automatic focusing and microscopic examination of a plurality of spatially distributed biological samples, through a microscope having an object stage that is movable along the z-axis in relation to the microscope, in accordance with the present description, wherein the microscope is adjusted to align a biological sample in the x/y plane by translating the carriage along the x/y-axes and wherein automatic focusing is achieved by translation of the sample stage along the z-axis and computer-aided analysis of the definition of digital microscope images in a plurality of positions of the object stage along the z-axis.

A preferred embodiment relates to a method for automatic focusing and microscopic examination of a plurality of spatially distributed biological samples using the apparatus described herein.

In a preferred embodiment, the invention relates to a method for automatic focusing and microscopic examination of a plurality of spatially distributed biological samples, through a microscope having an object stage that is vertically movable in relation to the microscope, comprising a carriage that is translatable along the x/y-axes in relation to the microscope and a sample stage on which the biological samples are disposed and which is mounted on the carriage and translatable along the z-axis in relation to the carriage, wherein the microscope is horizontally aligned with a biological sample by translating the carriage along the x/y-axes and wherein automatic focusing is achieved by translation of the sample stage along the z-axis and computer-aided analysis of the definition of digital microscope images in a plurality of vertical positions of the object stage.

In a preferred embodiment of the invention, the spatially distributed biological samples are analyzed consecutively and the automatic focusing is achieved individually for each sample by translation of the sample stage along the z-axis and computer-aided analysis of the definition of digital microscope images. This means that in between the microscopic analysis of the individual samples, the carriage moves along the x/y-axes in order to position the object stage relative to the microscope for analysis of the desired sample.

In a preferred embodiment, samples positioned side by side can be analyzed consecutively in a previously defined sequence. In other embodiments, the samples can be analyzed in a sequence (e.g., defined by the user), or the object stage can be moved to the desired position by software control (e.g., applied by the user).

In a further preferred embodiment of the invention, the samples are distributed spatially in a 6-, 12-, 24-, 48-, 96-, 384- or 1536-well multiwell plate and/or on an object carrier. The person skilled in the art is aware of such multiwell plates, which preferably comprise what are known as microtiter plates and in particular are obtainable in standardized formats. Likewise standardized and preferably automated preparation methods are also obtainable for such multiwell plates. In this way, beneficially, standardized methods can be used to analyze a large number of biological samples in an automated manner in the shortest time.

The average person skilled in the art recognizes that technical features, definitions and benefits of preferred embodiments of the apparatus according to the invention, in particular of the described object stage as part of the apparatus according to the invention, also apply to the method according to the invention and its embodiments.

Thereby, preferably, a plurality of vertical positions of the object stage comprises a plurality of vertical positions of the sample stage.

In this embodiment, the microscope can preferably also be horizontally aligned by a computer-aided analysis of the definition of digital microscope images, for example by using an algorithm for pattern recognition. Thereby, the analysis can preferably be limited to specific frequencies and/or frequency ranges of the detected electromagnetic radiation which are of particular interest.

In a preferred embodiment of the invention, the biological samples comprise fluorescence-marked particles and/or biological objects, such as e.g., cells, wherein the microscope is a fluorescence microscope, and wherein the automatic focusing occurs with regard to at least a fluorescence-marked particle and/or a fluorescence-marked biological object, such as e.g., a cell, of the sample.

Fluorescence microscopy is preferably a form of light microscopy which is based on the physical effect of the fluorescence and whereby a material under analysis fluoresces when excited by electromagnetic radiation (light) at certain frequencies or frequency ranges and thereby emits electromagnetic radiation at a lower frequency than that of the excitation. This light is preferably captured by the objective lens of the microscope and used for the analysis.

The samples can preferably be prepared in such a way that the particles and/or objects, which are intended to be detected by the microscope, are marked such that they fluoresce at a desired excitation frequency and/or a desired emission spectrum. In this way, the presence and/or the number of particles and/or objects can be identified.

The biological application of the apparatus according to the invention and the biological context of the method is not limiting for the present invention. There is a large number of possible applications for the apparatus according to the invention and/or the method according to the invention in the diagnostic, chemical, analytical and/or biological fields.

For example, the diagnosis of autoimmune disorders and/or the identification of autoantibodies in patient samples are possible applications for the method according to the invention.

Autoimmune disorders are disorders caused by an overreaction of the immune system against the body's own tissue. The immune system mistakenly identifies the body's own tissue as the foreign body it must combat. This triggers serious inflammatory reactions which cause damage to the affected organs. The immune system directs its defenses against the body's own structures (cellular and also humoral defense mechanisms, as a result of which antibodies are generated), causing these organs and tissues to lose their functionality over the course of time. The invention is therefore preferably aimed at diagnostics of autoimmune disorders.

In principle, a serological characterization of autoimmune disorders is possible through verification of the autoantibody-profiles.

The majority of these antibodies target nuclear and cytoplasmic antigens. Primarily antinuclear antibodies (ANA) are associated with rheumatic disorders. Some of these ANA are disease-specific and are used as diagnostic markers. These include, for example, antibodies against:
Double-stranded DNA (dsDNA) and the Sm antigen in the case of systemic lupus erythematosus (SLE)
Fibrillarin in the case of scleroderma, topoisomerase I (Scl-70) in the case of diffuse scleroderma, centromere (ACA) in the case of CREST
Histidyl-tRNA-Synthetase (Jo-1) in the case of polymyositis
PM-Scl in the case of overlapping between polmyositis and scleroderma ANA with differing prevalence are found in multiple disorders. These include: Anti-histone antibodies (AHA) in the case of SLE, drug-induced lupus and in the case of nutritive toxic chronic liver disease; Anti-RNP antibodies in the case of SLE and Sharp syndrome (MCTD: mixed connective tissue disease) and anti-SS-A (Ro) and anti-SS-B (La) antibodies in the case of SLE and Sjörgen syndrome. Antimitochondrial antibodies (AMA) of the anti-M2 type react with proteins of the alpha-ketoacid dehydrogenase complex of the mitochondria and are characteristic markers for primary biliary cirrhosis (PBC), which is a chronic cholestatic liver disease.

In a preferred embodiment of the invention, the apparatus according to the invention and/or the method according to the invention is used for an immunofluorescence test, preferably an indirect immunofluorescence test.

The immunofluorescence test (IFT) is a well-known method for verifying ANA and AMA, whereby frozen tissue sections or individual cells are used as a substrate. Preferably the HEp-2 cells are used. HEp-2 cells are a human Larynx Epithelioma cell line with a high specificity for most of the human autoantibodies against nuclear antigens (ANA/ENA). Systemic rheumatic inflammatory diseases, such as e.g., systemic lupus erythematosus (SLE) and its variants, progressive systemic sclerosis (PSS), primary Sjörgren's syndrome, dermatomyositis, Sharp syndrome (mixed connective tissue disease—MCTD), or rheumatoid arthritis (RA) are characterized by the development of a series of antibodies targeted against components of the nucleus and the cytoplasm. Although the etiopathogenic importance of these autoantibodies has not been fully clarified, they can be used as markers of various disease patterns as well as activity parameters.

An indirect ANA HEp-2 immunofluorescence test for qualitative and semiquantitative ANA identification takes place as follows:

In the first reaction step, the antibodies in diluted patient samples and controls react specifically with the antigens of HEp-2 cells fixed on an object carrier. In a preferred embodiment of the invention, this relates to a sample, representing one sample of a plurality of spatially distributed biological samples, which is or can be disposed on the sample stage of the apparatus according to the invention.

Unbound components are removed by a wash step after e.g., 30 minutes' incubation at room temperature. In the second reaction step, the bound antibodies react specifically with anti-human antibodies (e.g., IgG and lightchain specific), which are coupled to a marker, e.g., fluorescein isothiocyanate (FITC). Excessive conjugate molecules are separated from the solid-phase immune complexes after e.g., 30 minutes' incubation time at room temperature by a further wash step.

The various processing and wash steps may be performed on the sample stage, or separately from the apparatus according to the invention, and the samples, for example in a multiwell plate, are repositioned on the sample stage for analysis at a later time.

After covering, the object carriers or the individual samples on the sample stage are positioned under a fluorescence microscope (e.g., excitation wave length 490 nm, emission wave length 520 nm) with the aid of the apparatus according to the invention. According to the histologic alignment of antigens in the HEp-2 cell, a specific fluorescent pattern can be detected.

The analyzed images are evaluated e.g. by an automated method in autoimmune diagnostics by means of HEp-2 cells, using a system of analysis having for example the following features: A system for image capture using fluorescence microscope and digital camera, consisting of an automatic image analysis and identification of features describing fluorescence patterns, an automatic classification of fluorescence patterns and the output of the identified pattern to the laboratory data system. For example, a fluorescence microscope with camera and a standard PC serves as the capture unit. The fluorescence pattern resulting from the measurement currently enables detection of various basic patterns (e.g., homogenous, nucleolar, finely speckled, coarsely speckled, centromere, peripheral; multiple nuclear points).

Such a system is known for example from DE 198 01 400. DE 198 01 400 describes a method and a configuration for automatic detection, characteristic description and interpretation of HEp-2 cell patterns. This method and the corresponding configuration serve to verify autoimmune disorders, whereby the HEp-2 cell patterns are interpreted via two-dimensional image capture and digitalization, separation of the background from the image of the sectioned HEp-2 cells, categorization into a number of discreet classes, summary of the picture elements regarding individual objects, determination of features for the objects, comparison of the cell patterns and display and/or storage of the cell pattern and the associated class allocation. Such a system can be combined with the apparatus according to the invention in embodiments of the invention.

Also in WO2009062497, a system and method are described for automatic evaluation and classification of IFT fluorescence patterns comprising an end-titer determination of the autoantibodies. The present invention is very well suited for use in such systems and applications, when these concern the analysis of a plurality of spatially distributed biological samples, e.g., in a multiwell plate.

As described above, cell-based immunofluorescence testing, such as the verification of ANA with HEp-2 cells, is widespread in clinical diagnostics and research, as it is in industry. However, progress in assay development and in recombinant technology has paved the way for the verification of autoantibody specificities for individual antigens as targets and thus improved the diagnostic capability of antibody testing.

Multiplex assays based on fluorescent bead-based flow cytometry and microarray systems have proven to be powerful tools, which support a higher throughput analysis and more comprehensive tests of patient samples. Despite the development of enzyme-linked immunosorbent assay (ELISA) and multiplexing technologies for verification of disease-specific autoantibodies AAB, screening for ANA using IFT assays remains the standard method in the current multi-level diagnostic approach.

However, recombinant or purified antigens can meanwhile be prepared on beads, which are subsequently analyzed with the aid of IFT. Therefore, the present invention can also be used in a method by means of an immunofluorescence test for automatic detection of autoantibodies which bind to cellular and/or protein-specific antigens, as is described in WO 2011/101487.

In a preferred embodiment of the invention, the method for examination of autoantibodies in biological liquids comprises:
  bringing an immobilized substrate comprising at least one autoantigen into contact with a biological liquid containing autoantibodies,
  wherein the substrate is preferably a cellular substrate (e.g., HEp-2 cells, leukocytes, Crithidia luciliae and/or tissue sections) or preferably a synthetic substrate (e.g., microparticles) or a combination thereof, and the biological liquid is preferably a blood, plasma or serum sample,
  the complexation between the autoantibodies and the autoantigens of the substrate,
  the fluorescence marking of the autoantibodies immobilized in the complex, preferably by anti-human antibodies that are coupled to a fluorescence marker (e.g., fluorescein isothiocyanate (FITC)), and
  the microscopic analysis of the fluorescence-marked autoantibodies with a method as described above.

In a preferred embodiment, the method is characterized in that the synthetic substrates are microparticles, preferably between 1-100 μm in diameter. The synthetic substrates relate to microparticles, beads or carriers made out of any desired substances or materials, e.g., microparticles, particles or beads made out of natural or artificial polymers, sepharose, cellulose, glass or metal oxides. The synthetic substrates can be marked with fluorescent markers or preferably are already fluorescent, in order that additional fluorescent marking is not necessary.

Fluorescent markings can relate to molecules that are generally known in the prior art, such as e.g., fluorescent proteins, such as GFP, or rhodamine, fluorescein or derivatives thereof, such as FITC, TRITC or any type of suitable fluorophore.

In one embodiment, the method is characterized in that synthetic substrates and/or antibodies are specifically marked when using fluorescent markers. In a preferred embodiment, the particles are already marked with a fluorescent reagent before commencement of the process. The standardization and automation of immunofluorescence analysis in different laboratories with differing immunofluorescence equipment and methods represents a major challenge in the field of bioassays and diagnostics. The highly sensitive and selective detection and evaluation of fluorescence signals, in particular in cell-based assays, has led to the development of fluorescence tests as one of the most important detection methods in bioanalytics and diagnostics. The advantages of fluorescence detection, e.g., by means of fluorescence microscopy, lie in the high degree of detection sensitivity, relatively simple methods for the fluorescence marking of target objects in cells and the possibility of carrying out parallel analyses of a plurality of parameters, wherein a plurality of markings of different target objects are used with differing markers.

The present invention therefore enables improved and more reliable microscopic analysis, in particular of diagnostically relevant features of the samples, e.g., autoantibodies in samples from patients who may be suffering from autoimmune disorders.

Current developments in the area of immunofluorescent screenings are heading in the direction of more modular, more flexible and more compact, individually configurable systems, which enable a standardization of measurements. Automated interpretation systems, such as AKLIDES, represent optical fluorescence detection systems that can detect fluorescence signals sensitively and informatively.

Such systems consist of motorized inverse fluorescence microscopes, digital cameras, motorized object stages and computers with appropriate software for the evaluation and analysis. The object to be identified, such as e.g., particles, beads or cell structures, can be identified and described in an automatic and standardized manner with the aid of digital image processing algorithms.

The present invention can therefore be integrated into existing systems, such as e.g. AKLIDES, in order to improve the automated positioning of samples during analysis.

The invention can also be used in fluorescence microscopy for automated determination of cellular immunofluorescent foci.

In a preferred embodiment, the method is characterized in that the immunofluorescent foci are gamma H2Ax foci. H2Ax foci are particularly suitable for analysis and/or identification with the present invention, due to their size and other visual and physical qualities within the cell nucleus. Because of the size of the H2Ax foci, quantification can be very difficult, if one considers that the foci possibly overlap in the clustered spatial distribution within the nucleus.

The present invention solves this problem and enables a reliable automated quantitative analysis of H2Ax foci, as is described e.g., in WO2012168184.

The apparatus according to the invention enables a precise movement of the sample along the x-, y- and z-axes, and also comprises automatic focusing of the microscope. This improves the image capture of immunofluorescent foci, while the analysis of a plurality of samples can be carried out more quickly and the accuracy of the positioning of the samples is improved.

In a preferred embodiment of the invention, the method for automatic identification of cellular immunofluorescent foci comprises:
  Preparation of a mixture comprising cells for analysis and synthetic calibration particles, whereby cells and particles are immobilized on a solid phase,
  Identification of the synthetic calibration particles, whereby the synthetic calibration particles are preferably fluorescence-marked,
  Focusing the microscope based on the synthetic calibration particles by translating the sample stage along the z-axis and computer-aided analysis of the definition of digital microscope images in a plurality of positions along the z-axis, in particular vertical positions of the object stage,
  Incubation of the mixture with one or more fluorescence-marked antibodies, which bind to a target foci
  Identification of the bound antibodies using the microscope.

In a further preferred embodiment of the invention, the apparatus according to the invention can be used for fluorescence in situ hybridization (FISH).

Fluorescence microscopy is a highly sensitive and valuable method in clinical diagnostics. Genetic aberrations in cancer biopsies are routinely identified with fluorescence in situ hybridization (FISH). The increasing number of tumor patients, the great variety of probes and the diagnostic complexity of correctly interpreting the FISH signals require the development of an automated scanning and evaluation platform. In fact, the heterogeneity and complexity of the tumor-derived sections are challenging aspects of the analysis. Therefore, prefiltering of tumor-derived areas of interest is necessary, as well as detailed focusing on these parts with subsequent probe identification and evaluation.

The apparatus and the method of the present invention enable a plurality of samples, in particular a plurality of areas of a tumor tissue section, to be analyzed precisely, quickly and efficiently.

In order to facilitate a fully automated evaluation of a FISH assay, the fluorescence microscope platform must capture and evaluate the image independently. It is important to provide the doctor with the results in a suitable form, promptly and without time-consuming interaction. The apparatus of the invention thus offers a useful means for positioning samples for the described analysis.

In one embodiment, therefore, the analysis platform is based on a motorized microscope with exchangeable magnification and fluorescence filters, LED illumination with a plurality of wavelengths, a precise movable X-Y stage, as described herein, and a high-resolution grayscale camera (FIG. 7). All the hardware is controlled simultaneously through the setup of corresponding software.

The software is conceived such that it automatically captures and prefilters images. The stitching strategy captures images of DAPI (4',6-diamidino-2-phenylindole) stained nuclei. Due to the low magnification (100-200 times) and the quick focusing, overview images of the tissue sections can be captured in approx. 30 minutes (or fewer) (FIG. 8(A)). The entire image is filtered with algorithms (including entropy filters). Unspecific background specks, artifacts and the visible parts of the cover slip are removed. Dense cell areas, which are of greatest interest for detailed analysis via the FISH probe, are kept (FIGS. 8(B, C). Subsequently, these areas are scanned with a higher magnification (e.g., 400-600 times).

Individual cells are identified for detailed analysis via the FISH probe. A watershed transformation separates overlapping cell nuclei, by using wedges between intercellular structures (FIG. 9). The latter improves the selection of reference points for a marker-based watershed transformation.

An algorithm is used for detailed examination of various fluorescence signals in various z-layers. For this purpose, an image stack is created of five images at intervals of e.g., 500 nm, followed by consolidation into one sharp image using wavelet transformation (FIG. 10). The result is an image with all relevant signals of the given layers. The apparatus of the invention therefore represents an optimum solution for sample positioning and for obtaining images of a sample on various z-layers.

The intervals between the various fluorescence signals are used as parameters for the FISH classification. The software compares the classification rules for the FISH probe analysis with existing patterns after the signal examination and recommends a specific readout. The results are presented in a graphic user interface. All important steps, including the overview image and the separated cells, are displayed side by side—This enables manual navigation in the direction of the tumor section, in order to focus on detailed parts. All fluorescence channels (DAPI, ZyGreen™ ZyOrange™ and ZyBlue™) can be examined separately.

In a further preferred embodiment, the apparatus and method according to the invention can be used for the purpose of adhesion analysis of FISH-stained bacteria.

Bacteria adhesion is a prevalent phenomenon and a decisive step in the infection and colonization of host cells. Bacteria adhesion to organic material, such as cardiac valves, or inorganic material, such as prosthetics, bears a high risk of chronic infections. In order to determine the presence of bacteria adhering to various materials, the determination of attached bacterial species is of great interest.

The equipment setup as e.g., described in FIG. 7, including the apparatus of the present invention, may be used for this analysis.

With mathematical tools, the inventors developed an algorithm for detailed analysis of bacterial cells adhering to mammalian cells (HEp-2) and pig tissue sections. Infections of host cells were carried out with the cell line infection adhesion test (FIG. 11A) and a tissue infection adhesion test (FIG. 11B). Specific eubacterial FISH probe (EUB338 Atto647N) and typal *E. coli* probe (EC0453 Atto647N) were used for staining bacteria. The DAPI staining was carried out for the host analysis.

With the aid of automated digital imaging technology, the inventors developed a tool for identifying and counting bacterial cells, which were stained with fluorescence in situ hybridization (FISH). Accordingly, infection adhesion assays can be carried out, in order to infect human tumor cells and other tissue sections. With the aid of infection adhesion assays for cell lines and tissue sections, the inventors infected the host cells with EPEC and EAggEC. Thereby, a software algorithm was used to count FISH-stained bacteria also in colonies (FIG. 12). Therefore, automated digital image analysis of FISH-stained bacteria is a promising alternative to time-consuming manual methods and is supplemented and improved by the use of the apparatus of the present invention for positioning the samples and for enabling effective autofocusing and analysis.

Hereinafter, the invention shall be described in more detail using examples and figures, without being limited to these.

Referring now to the figures, FIG. 1 shows a schematic representation of the apparatus 1. It hereby illustrates the sample stage 5 mounted on the carriage 3. It also illustrates how the carriage 3 is mounted translatably over the tube 7 on the frame of the apparatus 1 and can be positioned by a positioning actuator along the x/y-axes with the aid of a toothed belt 9.

Figure 2:
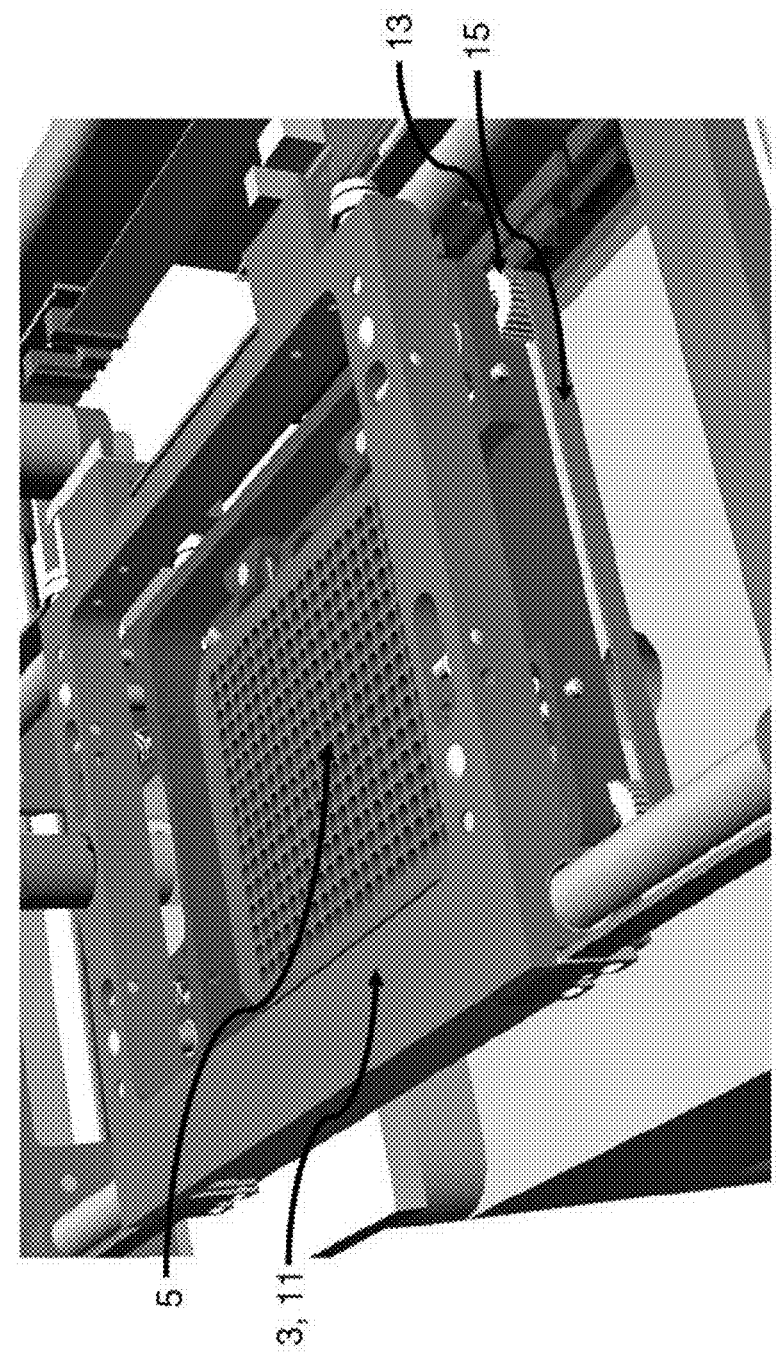
FIG. 2 shows a detailed view of the carriage and the sample stage of FIG. 1 that is translatable vertically in relation to said carriage according to embodiments of the invention.

FIG. 2 shows a detailed view of the carriage 3 and the sample stage that is translatable vertically in relation to said carriage 5. It also illustrates two threaded spindles driven by a toothed belt 15 on toothed wheels 13.

Figure 3:
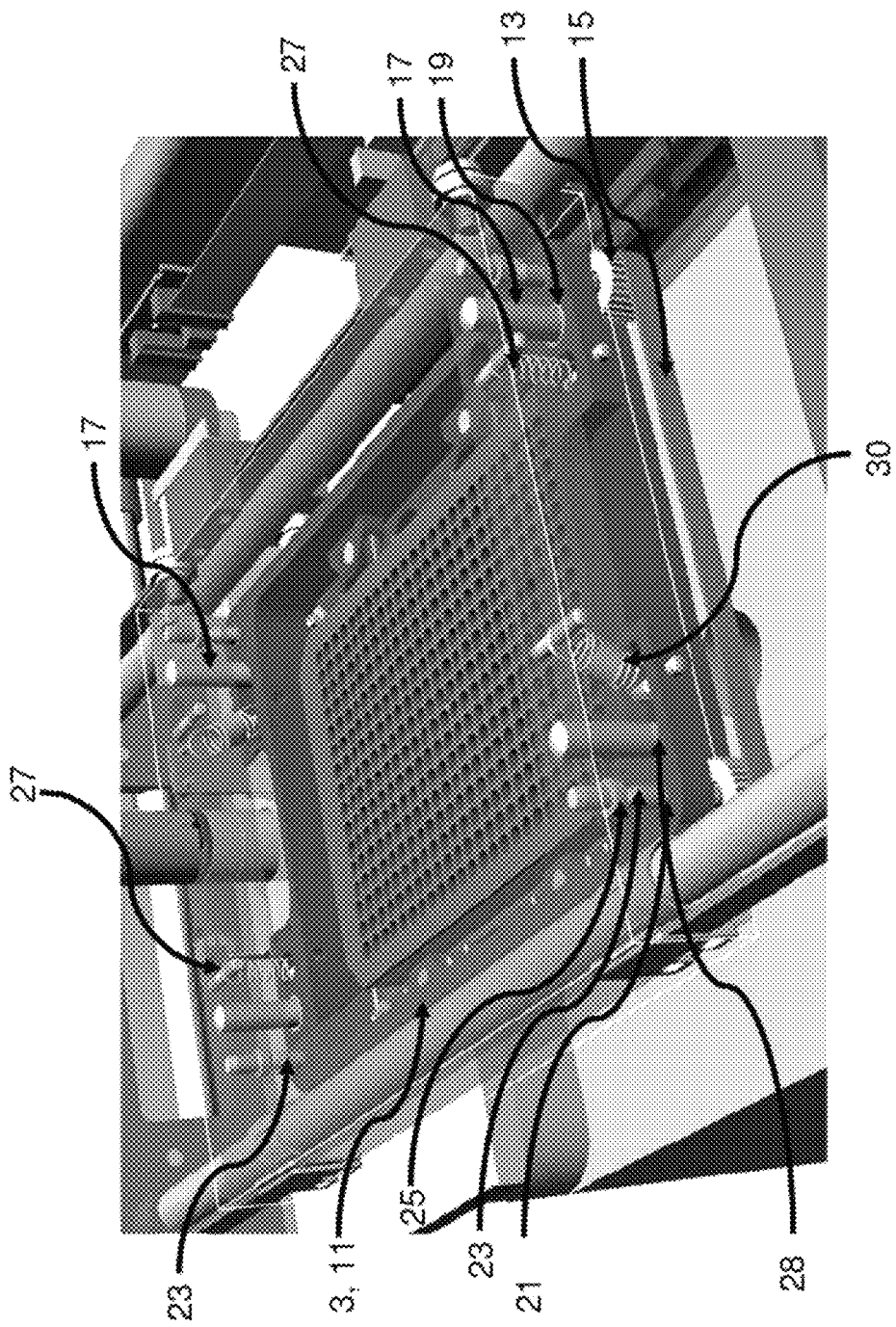
FIG. 3 shows the same view of FIG. 2 with a part of the carriage represented transparently for better recognizability of the mechanism.

FIG. 3 shows the same view with a frame-like part of the carriage 11 represented transparently for better recognizability of the mechanism. It thereby illustrates the vertical pins 17 on which the sample stage is preferably mounted through a linear bearing and/or sliding bearing 19 and by which the relative positioning of the sample stage 5 in relation to the carriage 3 is ensured. The sample stage 5 comprises spindle nuts 21 that are immovably fixed to it, in which the threaded spindles 23 are guided. If the spindles 23 are rotated, the sample stage 5 travels vertically relative to them. The threaded spindles 23 are driven by a toothed belt 15 via toothed wheels 13. These are preferably wide enough that the entire width of the toothed belt 15, which is preferably moving together with the sample stage 5, is in contact with the toothed wheels 13 across the entire range of travel. It also illustrates how the threaded spindles 23 are mounted via a jewel bearing 25 on the upper end of the carriage 3, enabling a rotatory movement of the spindle 23, however mounting them only to a limited extent in a positionally fixed manner. In particular, this type of mounting preferably does not exert any force on the threaded spindles 23 against the direction of gravity, which is why a vertical positioning of the spindles 23 is enabled by springs 27 mounted between carriage 3 and sample stage 5 with an attractive force between the two. It also illustrates the prismatic shaped sliding bearings 28 in the sample stage 5 that are additionally used in this embodiment for mounting the vertical pins 17, which are preferably used together with the springs 30 that are disposed at an angle to the vertical. The springs 30 thereby exert a force which supports the positioning and guidance of the vertical pins 17 in the prismatic shaped sliding bearing 28.

Figure 4:
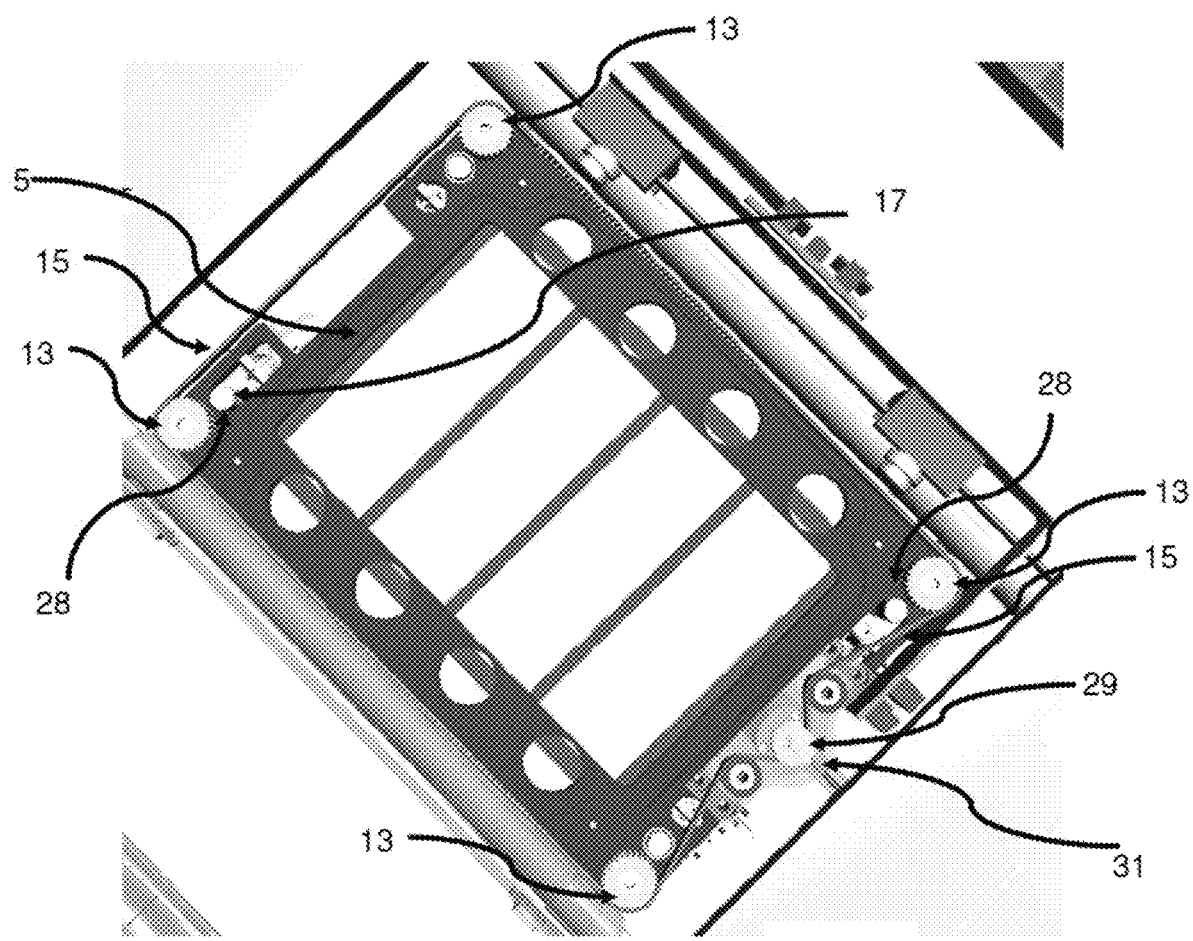
FIG. 4 shows the sample stage from below.

FIG. 4 shows in particular the sample stage 5 from below. It thereby illustrates the four toothed wheels 13 of the four threaded spindles 23 in the four corner areas of the sample stage 5, which are driven by a common toothed belt 15. The toothed belt 15 is in turn driven by a driving toothed wheel 29 on a shaft of an electric motor, whereby the motor is mounted on the sample stage 5 in order to minimize negative effects from strand forces, which could be transmitted through the toothed belt 15 from the driving toothed wheel 29 to the threaded spindles 23. Negative effects could for example consist in the sample stage 5 being deflected along the x/y-axes in relation to the carriage 3 when the threaded spindles 23 are driven by the toothed belt 15 with the aim of achieving a vertical translation of the sample stage 5. The motor is preferably immovably connected to the sample stage 5 in the form of a mechanically stable bearing plate 31. It also illustrates the prismatic shaped sliding bearing 28 that is diagonally disposed on the sample stage 5.

Figure 5:
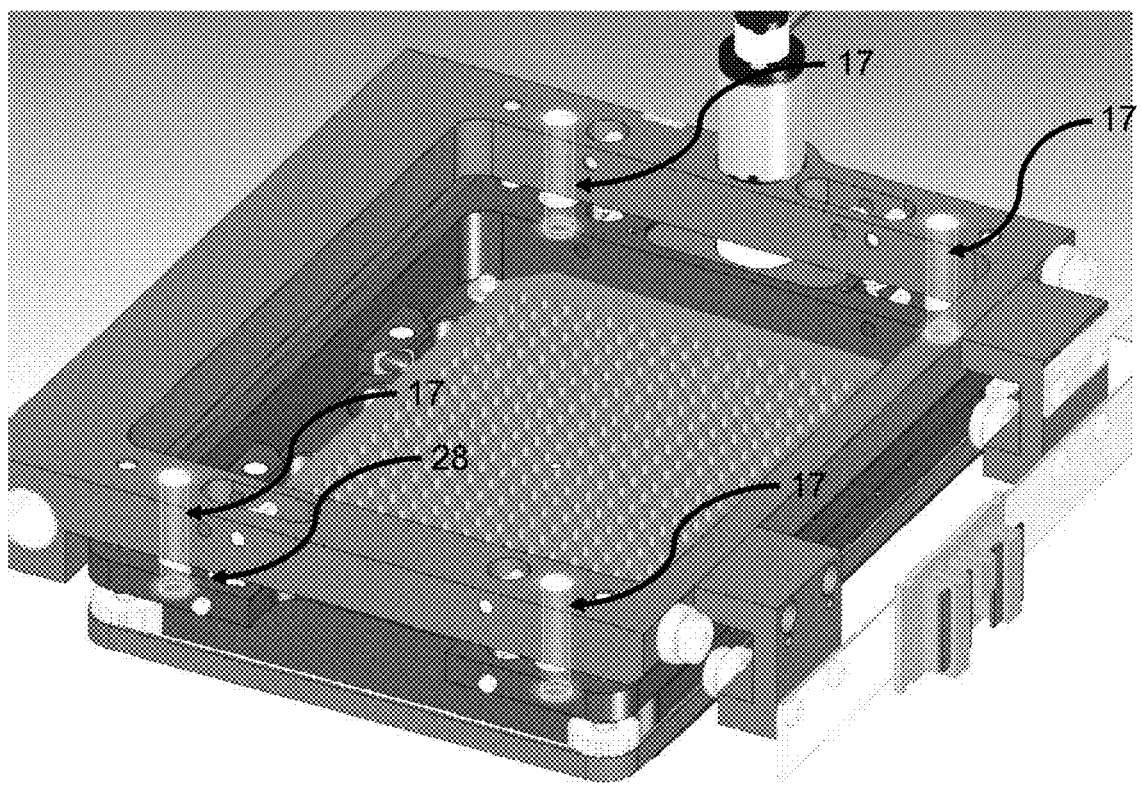
FIG. 5 is a detailed view of the sample stage, which is guided by 4 vertical pins in accordance with an embodiment of the invention.

FIG. 5 shows the sample stage 5 when using four pins 17 disposed along the z-axis, of which two are guided in a linear bearing 19 and two in a prismatic shaped sliding bearing 28.

Figure 6:
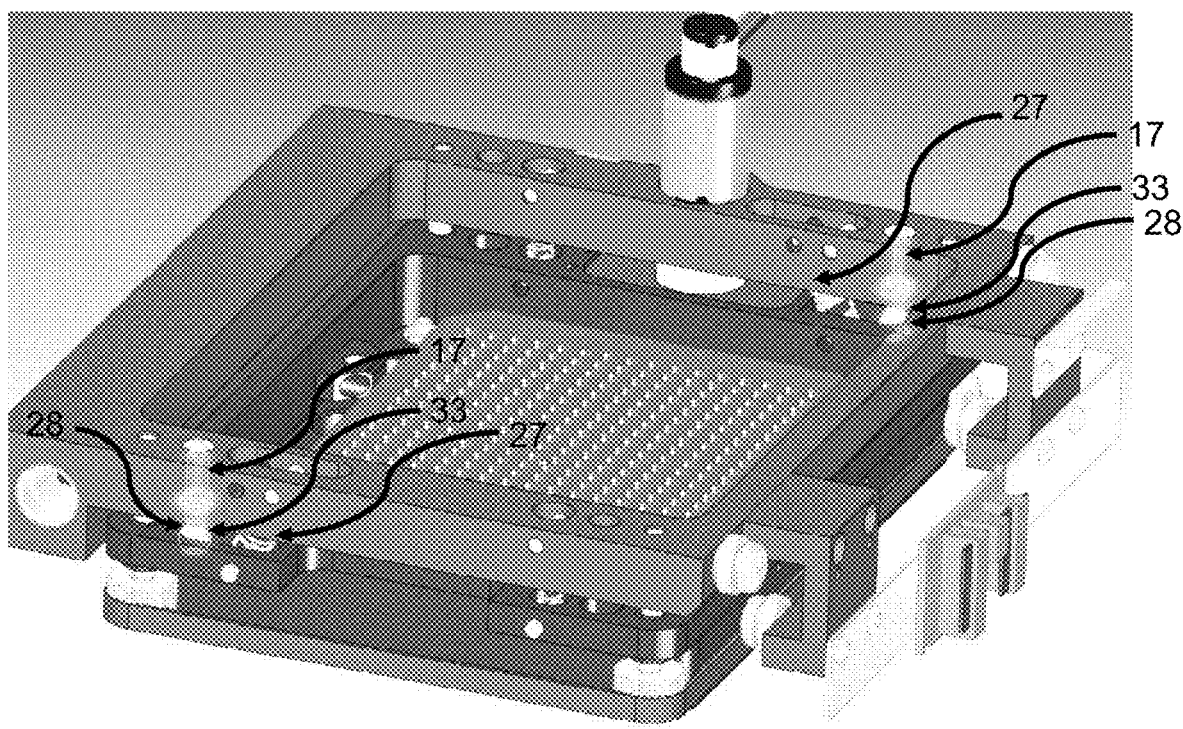
FIG. 6 illustrates a sample stage, which is guided by 2 vertical pins with spherical section and prismatic sliding bearing in accordance with an embodiment of the invention.

FIG. 6 shows the sample stage 5 comprising two pins 17 disposed along the z-axis, with spherical section 33. Thereby, the pins 17 with their spherical section 33 are guided along the z-axis in the prismatic shaped bearing 28 across the entire range of travel of the sample stage 5. This beneficially entails approximately only two points of contact respectively between pin 17 and bearing 28, because the pin is guided in the prismatic part of the sliding bearing. The friction and in particular the stick-slip effect can preferably be minimized. This mounting with only two pins 17 and sliding bearings 28 is preferably supported by the spring forces of two diagonally disposed springs 27 between sample stage and carriage. It thus enables each sliding bearing 28 to touch each spherical section 33 only at 2 points and not at all on the opposite sides of the spherical section 33 while nevertheless a guidance is achieved which prevents any movement along the x/y-axes.

FIGS. 7-12F show example representations of the invention and results of the application of the apparatus according to the invention, as described above.

FIG. 7 illustrates an automatic modular fluorescence microscope with an embodiment of the movable sample stage of the present invention, lateral camera, and mounted LED in the background.

FIGS. 8A-8C show various image filtering of tumor sections. FIG. 8A is an overview scan of the tissue section. FIG. 8B shows Filtered areas with low entropy (background, artifacts or overexposure). FIG. 8C shows a section for detailed FISH analysis (frame).

FIGS. 9A-9C illustrate watershed transformation. FIG. 9A shows an overview of the section for the FISH probe analysis. FIG. 9B shows a result of the Wedge Watershed Transformation. FIG. 9C shows a result of the conventional Watershed Transformation with various marker points.

FIG. 10 illustrates image consolidation by Wavelet Transformation. Combination of images in order to obtain relevant signals from a plurality of layers in cell nuclei.

FIGS. 11A and 11B show adhesion assay where the cell culture (FIG. 11A) or the pig tissue (FIG. 11B) was infected with a defined quantity of bacteria (2), and after 3 hours incubation (3), the fixation in formalin was carried out (FIG. 11A+FIG. 11B) and the tissue was embedded in paraffin and sliced with a microtome (FIG. 11B), and subsequently the FISH analysis was carried out (FIG. 11A+FIG. 11B).

FIGS. 12A-12F illustrate images from evaluation software for identifying and counting adhering bacteria in cell culture (FIG. 12A+FIG. 12B+FIG. 12C+FIG. 12D) and pig tissue (FIG. 12e+FIG. 12F), where bacteria cells were stained with FISH (Atto647N) and infected host cells with DAPI, and a software algorithm was able to capture high-resolution images (FIGS. 12A, 12C, 12E) and identify stained bacteria (FIGS. 12B, 12D, 12F), where bacteria were counted and the size and shape of colonies were analyzed. The number of bacterial cells per mm$^2$ was determined.

LIST OF REFERENCE NUMERALS

1 Apparatus
3 Carriage
5 Sample stage
7 Guide tube for carriage
9 Toothed belt drive for carriage
11 Carriage frame
13 Toothed wheel of the threaded spindle
15 Toothed belt for sample stage
17 Pin disposed along the z-axis (e.g.) vertically
19 Linear bearing
21 Spindle nut
23 Threaded spindle
25 Mounting of the threaded spindle on the carriage
27 Spring
28 Prismatic shaped sliding bearing
29 Driving toothed wheel of the motor
30 Diagonally arranged spring
31 Mounting plate for the motor
33 Spherical section

The invention claimed is:

1. An apparatus (1) for automatic focusing for a microscopic examination of a plurality of spatially distributed samples, comprising: a microscope and an object stage which is movable along a z-axis relative to the microscope,
   wherein the apparatus is configured for automatic focusing by computer-aided analysis of a definition of digital microscope images in a plurality of vertical positions of said object stage;
   wherein said object stage comprises a carriage (3) in the form of a frame and a sample stage (5) mounted on said carriage (3);
   wherein said sample stage (5) is translatable along the z-axis relative to the carriage (3);
   wherein said carriage (3) is translatable in an x/y plane along x and y axes relative to the microscope;
   wherein the translation of said sample stage (5) along the z-axis is effected by a mechanical actuator, wherein said mechanical actuator comprises a motor and drive means, and wherein the motor and drive means are configured for translating said sample stage along the z-axis;
   wherein said drive means comprise at least one threaded spindle (23) disposed along the z-axis, which is mounted translatably in a spindle nut (21) that is immovably connected to said sample stage (5);
   wherein said motor is configured to control a rotatory movement of said at least one threaded spindle (23), and wherein said at least one threaded spindle (23) is positioned rotatably and immovably at least in an axial direction on said carriage (3); and
   wherein the rotatory movement is transmitted from a motor shaft, fitted with a driving toothed wheel (29), via a toothed belt (15) to a toothed wheel (13) that is connected in a non-rotatable manner to said at least one threaded spindle (23).

2. The apparatus (1) according to claim 1, wherein said motor is connected to the sample stage (5).

3. The apparatus (1) according to claim 1, wherein the apparatus comprises 3 to 5 threaded spindles (23) disposed along the z-axis.

4. The apparatus (1) according to claim 1, wherein said toothed wheel (13) is wider than a sum of travel along the z-axis of said sample stage (5) and a width of said toothed belt (15) wherein said toothed wheel (13) and said toothed belt (15) are arranged such that said toothed belt is essentially disposed with its full width on said toothed wheel across a complete range of travel of said sample stage.

5. A method for automatic focusing and microscopic examination of a plurality of spatially distributed biological samples, employing the apparatus according to claim 1,
   wherein the microscope is adjusted to align a biological sample in the x/y plane by translating said carriage (3) along the x and y axes; and
   wherein automatic focusing is achieved by translation of said sample stage (5) along the z-axis and computer-aided analysis of the definition of digital microscope images in a plurality of vertical positions of said object stage.

6. A method according to claim 5, wherein the biological sample comprise at least one of fluorescence-marked particles or biological objects; and wherein the microscope is a fluorescence microscope, and wherein the automatic focusing occurs with regard to at least one of a fluorescence-marked particles or a fluorescence-marked biological objects of the biological sample.

7. The method according to claim 5, comprising an examination of autoantibodies in biological liquids, wherein the method comprises:
bringing an immobilized substrate comprising at least one autoantigen into contact with a biological liquid containing autoantibodies, wherein said immobilized substrate is at least one of a cellular substrate, tissue sections or a synthetic substrate, or a combination thereof;
allowing a complex to form between the autoantibodies and the at least one autoantigens of the substrate;
fluorescence marking of the autoantibodies immobilized in the complex; and
microscopic analysis of the fluorescence-marked autoantibodies with a method according to claim 5.

8. The method according to claim 5, comprising an automatic identification of cellular immunofluorescent foci, wherein the method comprises:
preparing a mixture comprising cells for analysis and synthetic calibration particles, whereby cells and particles are immobilized on a solid phase;
identifying the synthetic calibration particles, whereby the synthetic calibration particles are fluorescence-marked;
focusing the microscope based on the synthetic calibration particles by translating said sample stage (5) along the z-axis and computer-aided analysis of the definition of digital microscope images in a plurality of positions along the z-axis of said object stage;
incubating the mixture with one or more fluorescence-marked antibodies, which bind to a target foci; and
identifying the bound antibodies using the microscope.

9. An apparatus (1) for automatic focusing for a microscopic examination of a plurality of spatially distributed samples, comprising:
a microscope and an object stage which is movable along a z-axis relative to the microscope,
wherein the apparatus is configured for automatic focusing by computer-aided analysis of a definition of digital microscope images in a plurality of vertical positions of said object stage;
wherein said object stage comprises a carriage (3) and a sample stage (5) mounted on said carriage (3);
wherein said sample stage (5) is translatable along the z-axis relative to the carriage (3);
wherein said carriage (3) is translatable in an x/y plane along x and y axes relative to the microscope; and
wherein said sample stage (5) has rectangular dimensions and comprises in every corner of said sample stage (5) a threaded spindle mounted in a spindle nut (21) or has round dimensions and comprises at least 3 threaded spindles (23) mounted in a spindle nut (21) arranged along a perimeter area of said sample stage (5), wherein a rotatory movement is transmitted via a toothed belt (15).

10. An apparatus (1) for automatic focusing for a microscopic examination of a plurality of spatially distributed samples, comprising:
a microscope and an object stage which is movable along a z-axis relative to the microscope,
wherein the apparatus is configured for automatic focusing by computer-aided analysis of a definition of digital microscope images in a plurality of vertical positions of said object stage;
wherein the object stage comprises a carriage (3) and a sample stage (5) mounted on the carriage (3);
wherein said sample stage (5) is translatable along the z-axis relative to the carriage (3);
wherein said carriage (3) is translatable in an x/y plane along x and y axes relative to the microscope;
wherein said sample stage (5) is mounted translatably along the z-axis on said carriage (3) by at least two pins (17), said at least two pins being aligned with the z-axis; and
wherein said sample stage (5) comprises at least two partially prismatic shaped sliding bearings (28) and said at least two pins (17) aligned with the z-axis respectively each comprise a spherical section (33), wherein said prismatic shaped sliding bearings (28) and said spherical sections (33) are configured for guidance of said sample stage (5) along the z-axis.

11. The apparatus according to claim 10, wherein the apparatus further comprises at least one spring (27) per sliding bearing (28), wherein said at least one spring (27) exerts a tractive force between said sample stage (5) and said carriage (3).

* * * * *